(12) United States Patent
Kurohmaru

(10) Patent No.: US 6,871,254 B2
(45) Date of Patent: Mar. 22, 2005

(54) PROCESSOR AND STORAGE APPARATUS

(75) Inventor: Shunichi Kurohmaru, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 280 days.

(21) Appl. No.: 10/316,037

(22) Filed: Dec. 11, 2002

(65) Prior Publication Data

US 2003/0110345 A1 Jun. 12, 2003

(30) Foreign Application Priority Data

Dec. 12, 2001 (JP) .......................................... 2001-378891

(51) Int. Cl.⁷ ............................................. G06F 12/00
(52) U.S. Cl. ..................... 711/100; 711/154; 711/168; 711/169; 711/200; 365/230.01; 365/230.03; 365/230.05; 365/230.08
(58) Field of Search ................................. 711/100, 154, 711/168, 169, 200; 365/230.01, 230.03, 230.05, 230.08

(56) References Cited

U.S. PATENT DOCUMENTS

| | | | |
|---|---|---|---|
| 4,567,562 A | 1/1986 | Fassbender | 711/148 |
| 4,982,322 A | 1/1991 | Eggers et al. | 711/152 |
| 5,075,846 A | 12/1991 | Reininger et al. | 700/90 |
| 5,377,154 A * | 12/1994 | Takasugi | 365/221 |
| 5,440,717 A | 8/1995 | Bosshart | 711/159 |
| 5,502,835 A * | 3/1996 | Le et al. | 711/169 |
| 5,574,924 A * | 11/1996 | Yoshinaga et al. | 712/7 |
| 5,668,971 A * | 9/1997 | Neufeld | 711/111 |
| 5,752,270 A * | 5/1998 | Wada | 711/169 |
| 5,812,185 A * | 9/1998 | Mizuno et al. | 348/14.13 |
| 5,897,667 A * | 4/1999 | Miller et al. | 711/218 |
| 6,003,098 A * | 12/1999 | Krech, Jr. | 710/51 |
| 6,035,427 A * | 3/2000 | Kweon | 714/702 |
| 6,044,416 A * | 3/2000 | Hasan | 710/52 |
| 6,480,631 B2 | 11/2002 | So et al. | 382/248 |

FOREIGN PATENT DOCUMENTS

| | | | |
|---|---|---|---|
| EP | 193654 A2 | 9/1986 | G06F/9/38 |
| JP | 7-111586 | 4/1995 | H04N/1/387 |
| JP | 200-251065 | 9/2000 | G06T/5/20 |
| WO | 97/14093 | 4/1997 | G06F/9/30 |

* cited by examiner

*Primary Examiner*—Stephen Elmore
(74) *Attorney, Agent, or Firm*—Wenderoth, Lind & Ponack, L.L.P.

(57) ABSTRACT

An operating unit operates candidate operation data Da, Db. The candidate operation data Da, Db are contained in two source memories, respectively, or alternatively in one of the two source memories. An address-generating unit generates an address signal Aa and read enable signals RE1a, RE2a in connection with the candidate operation data Da. The address-generating unit further generates an address signal Ab and read enable signals RE1b, RE2b in connection with the candidate operation data Db. Thus, data output from the source memory is controlled with each data to be operated, not with each of the source memory. As a result, data transfer-caused loads can be suppressed. This feature provides a processor having enhanced performance, and further reduces electric power that the processor consumes.

22 Claims, 14 Drawing Sheets

PROCESSOR AND STORAGE APPARATUS

BACKGROUND OF THE INVENTION

1. Field of the Invention

The present invention relates to a processor designed to perform a desired operation on parallel readout data from a plurality of source memories, and an art related thereto.

2. Description of the Related Art

FIG. 10 is a block diagram illustrating a prior art processor. As illustrated in FIG. 10, the processor includes a pair of source memories 501, 502, an address-generating unit 503, and an operating unit 504. The operating unit 504 includes a computer (not shown).

The source memories 501, 502 contain data. The address-generating unit 503 generates address signals A1, A2, read enable signals RE1, RE2, and an operation practice enable signal EE.

A pair of registers 601, 602 retains readout data RD1, RD2 from the source memories 501, 502, respectively.

The operating unit 504 performs an operation on candidate operation data D1, D2 that are fed from the resistors 601 and 602, respectively.

The following briefly describes how the data are read out.

As illustrated in FIG. 10, the data are read out as readout data RD1 from the source memory 501 to the register 601 in response to the address signal A1 and the read enable signal RE1.

Meanwhile, the data are read out as readout data RD2 from the source memory 502 to the register 602 in response to the address signal A2 and the read enable signal RE2.

The operating unit 504 operates the candidate operation data D1, D2 in response to the operation practice enable signal EE.

The following describes data readout with reference to a specific example.

FIG. 11 is a descriptive illustration showing different sets of data contained in the source memories 501, 502 of FIG. 10, respectively.

FIG. 12 is a timing diagram describing how the respective sets of data in the source memories 501, 502 of FIG. 10 are read out.

As illustrated in FIG. 11, assume that the source memory 501 includes a series of candidate operation data D1-yielding data at addresses 0–5, while the source memory 502 includes a series of candidate operation data D2-yielding data at addresses 6#–11#.

As illustrated in FIG. 12, at time "t1", the read enable signals RE1, RE2 are asserted. As a result, data 0, 6# can be read out as readout data RD1, RD2 in parallel with one another from the source memories 501, 502, respectively.

At time "t2", the operation practice enable signal EE is asserted. As a result, at time "t3", data 0 and 6# can be entered into the operating unit 504 as candidate operation data D1, D2, respectively.

Similarly, the remaining data 1–5 and the remaining data 7#–11# can be read out.

However, a problem as discussed below arises when either the source memory 501 or the source memory 502 contains the candidate operation data D1-yielding data and the candidate operation data D2-yielding data.

FIG. 13 is a descriptive illustration showing different sets of data contained in the source memory 501 of FIG. 10.

FIG. 14 is a descriptive illustration showing how the different sets of data in the source memory 501 of FIG. 10 are read out.

As illustrated in FIG. 13, assume that the source memory 501 contains a series of the candidate operation data D1-yielding data at addresses 0–5 and a series of the candidate operation data D2-yielding data at addresses 6–11.

In this instance, as illustrated in FIG. 14, the series of data in the source memory 501 at addresses 6–11 is at first transferred to the source memory 502 at addresses 6#–11# through a data-transferring path 505.

In this way, the transferred data and non-transferred data are arranged in a manner as illustrated in FIG. 11. This step must be taken before a desired operation is performed on the data in the source memory 501 at addresses 0–5 and those in the source memory 502 at addresses 6#–11#.

As described above, when either the source memory 501 or the source memory 502 contains both of the candidate operation data D1-yielding data and the candidate operation data D2-yielding data, loads occur to permit one of such data to be transferred to the other source memory.

In particular, such a disadvantage is turned out to be a problem when a situation as described below is present.

A recent system LSI, in particular, a media-processing LSI that handles image data, requires a very high level of performance. Such requirements tend to be more and more stringent every year because of larger-sized images to be handled as well as enlarged and complicated processing systems to be supported.

In order to meet such requirements, efforts have been made to provide enhanced performance to a processor that is designed to practice a desired operation on parallel readout data from a plurality of source memories. More specifically, the processor has computers horizontally aligned with each other in order to parallel-run them. Alternatively, the computers are vertically aligned with each other in order to provide a deep pipeline. By way of a further alternative, the computers are provided with a system-adapted function. Such efforts have brought about great beneficial effects on an increase in computing performance.

By analyzing LSI processing, it has been determined that the above devised use of the computers to cope with pure signal-processing operation enhances the performance of the processor.

As discussed above, the prior art focuses on the computer in order to provide the enhanced performance of the processor.

However, such an increase in computing performance simultaneously renders the previously described data transfer-caused loads noticeable, which has been inconspicuous so far. As a result, the processor sometimes fails to exercise its performance to the greatest extent.

More specifically, as discussed above, when one of the source memories 501, 502 contains the candidate operation data D1-, D2-yielding data, then one of the data must be transferred to the other source memory although the devised use of the computers enhances the computing performance. This causes a problem in that the processor may fail to exercise its performance to the greatest extent.

Another problem is that electric power is required for transferring the data to the other source memory, which is a factor contributing to a failure in power saving.

OBJECT AND SUMMARY OF THE INVENTION

In view of the above, an object of the present invention is to provide a processor designed to enhance computing performance and consume a reduced quantity of electric power by inhibiting data transfer-caused loads to an extreme extent, and an art related thereto.

A first aspect of the present invention provides a processor comprising a plurality of storage units operable to store data, a first data-retaining unit operable to retain data fed from one of the storage units in order to send out the retained data as first candidate operation data, a second data-retaining unit operable to retain data fed from one of the storage units in order to send out the retained data as second candidate operation data, an operating unit operable to operate the first and second candidate operation data that are paralleled into the operating unit from the first and second data-retaining units, respectively, and an address-generating unit. The address-generating unit generates a first address signal for showing a storage position at which first candidate operation data-yielding data is stored in one of the storage units, a second address signal for showing a storage position at which second candidate operation data-yielding data is stored in one of the storage units, a first read enable signal generated with each of the storage units for controlling the output of the first candidate operation data-yielding data from the corresponding storage unit, and a second read enable signal generated with each of the storage units for controlling the output of the second candidate operation data-yielding data from the corresponding storage unit.

Each of the storage units allows data stored at the storage position addressed by the first address signal to be fed into the first data-retaining unit in response to the first read enable signal.

Each of the storage units allows data stored at the storage position addressed by the second address signal to be fed into the second data-retaining unit in response to the second read enable signal.

The above structure generates the first address signal and the first read enable signal in connection with the first candidate operation data, and further generates the second address signal and the second read enable signal in connection with the second candidate operation data. Consequently, data output from the storage units is controllable for each data to be operated, and not for each of the storage units.

This feature allows the first and second candidate operation data-yielding data to be fed into the first and second data-retaining unit, respectively, without the need for transferring the data to another storage unit even when the same storage unit stores the first and second candidate operation data-yielding data.

As a result, data transfer-caused loads can be suppressed and high-speed processing is achievable. This feature provides a processor having further enhanced performance.

In addition, the suppressed data transfer-caused loads reduce the electric power that the processor consumes.

According to a second aspect of the present invention, a processor as defined in the first aspect of the present invention is provided. The storage unit includes first and second storage areas in which a set of even-numbered addresses is allocated to the first storage area, while a set of odd-numbered addresses is allocated to the second storage area.

Even when the same storage unit stores the first and second candidate operation data-yielding data, the above structure according to the second aspect of the present invention allows the first and second candidate operation data-yielding data to be parallel-transferred at high frequency into the first and second data-retaining units, respectively, when such stored data are vector data having a lot of successive addressing.

As a result, when the storage unit stores the vector data having a lot of successive addressing, then higher-speed processing is achievable. This feature provides a processor having further enhanced performance.

According to a third aspect of the present invention, a processor as defined in the first aspect of the present invention is provided. The storage unit includes first and second storage areas in which a set of successive addresses is allocated to the first storage area, while a different set of successive addresses is allocated to the second storage area.

The above structure allows a pair of data in common use, which must be stored in the same storage unit, to be stored in the storage unit at the first and second storage areas, respectively. As a result, the pair of data can be parallel-transferred to the first and second data-retaining units, respectively, regardless of whether such parallel data transfer is conducted according to successive or random addressing.

As a result, higher-speed processing is achievable regardless of the successive or random addressing. This feature provides a processor having further enhanced performance.

In addition, when data storage positions in the storage unit are set in programming in order to provide the above beneficial effects, then all that is required is to consider that the data can be stored at either the first or second storage are. This means that a lighter burden is imposed on a programmer.

According to a fourth aspect of the present invention, a processor as defined in the first aspect of the present invention is provided. The storage unit includes first, second, third, and fourth storage areas. A set of even-numbered addresses and a set of odd-numbered addresses are allocated to the first and second storage areas, respectively. A set of successive addresses, which differs from the previous sets of addresses, and a yet further different set of successive addresses are allocated to the third and fourth storage areas, respectively.

Even when the same storage unit stores the first and second candidate operation data-yielding data, the above structure according to the fourth aspect of the present invention allows the first and second candidate operation data-yielding data to be parallel-transferred at high frequency to the first and second data-retaining units, respectively, when the first and second candidate operation data-yielding data are vector data to be accessed according to successive addressing.

As a result, when the storage unit stores the vector data having a lot of successive addressing, then higher-speed processing is achievable. This feature provides a processor having further enhanced performance.

Furthermore, when a pair of data in common use, which must be stored in the same storage unit, is stored in the storage unit at the third and fourth storage areas, respectively, then the pair of data can be parallel-transferred to the first and second data-retaining units, respectively, regardless of whether the parallel data transfer is conducted according to successive or random addressing.

As a result, higher-speed processing is achievable regardless of the successive or random addressing. This feature provides a processor having further enhanced performance.

Furthermore, when data storage positions in the storage unit are set in programming in order to provide the above beneficial effects, then all that is required is to consider that the data can be stored at either the third or fourth storage areas. As a result, a lighter burden is imposed on a programmer.

As described above, when the storage unit stores different sets of successive addressing accessible vector data at the first and second storage areas, respectively, then the different sets of successive addressing accessible vector data can be parallel-transferred at high frequency to the first and second data-retaining units, respectively. In addition, when each pair of data is programmed to be stored at the third and fourth storage areas, respectively, then the pair of data can be parallel-transferred to the first and second data-retaining units, respectively, regardless of whether the parallel data transfer is conducted according to successive or random addressing. As a result, high-speed processing is realized, and consequently a processor having further enhanced performance is operable with a greater degree of freedom.

According to a fifth aspect of the present invention, a processor as defined in the second or fourth aspect of the present invention is provided. When the same storage unit contains first and second address signal-addressed data at either the first storage area or the second storage area, and further when neither the first data-retaining unit nor the second data-retaining unit retains data, then the storage unit feeds the first address signal-addressed data into the first data-retaining unit.

The storage unit feeds the second address signal-addressed data into the second data-retaining unit when the same storage unit contains the first and second address signal-addressed data at either the first storage area or the second storage area, and further when the second data-retaining unit does not contain data to be operated with every data held in the first data-retaining unit.

The storage unit feeds the first address signal-addressed data into the first data-retaining unit when the same storage unit contains the first and second address signal-addressed data at either the first storage area or the second storage area, and further when the second data-retaining unit always retains data to be operated with data held in the first data-retaining unit.

The storage unit feeds the second address signal-addressed data into the second data-retaining unit when the same storage unit contains the first and second address signal-addressed data at either the first storage area or the second storage area, and further when the second data-retaining unit does not retain data to be operated with any data among several pieces of data held in the first data-retaining unit.

The above structure allows the storage unit to at first feed any data into either the first data-retaining unit or the second data-retaining unit when the same storage unit contains the first and second address signal-addressed data at either the first storage area or the second storage area. This step adjusts the timing of data output into the first and second data-retaining units.

Furthermore, the storage unit has a set of even-addressed addresses allocated to the first storage area and a set of odd-numbered addresses allocated to the second storage area As a result, when the storage unit stores vector data having a lot of successive addressing, then the first and second address signal-addressed data can be parallel-transferred to the first and second data-retaining units, respectively, after the timing of data output into the first and second data-retaining units is adjusted.

As described above, the first and second address signal-addressed data can be parallel-transferred at high frequency to the first and second data-retaining units, respectively, when the parallel transferred data are the vector data having a lot of successive addressing.

As a result, higher-speed processing is achievable. This feature provides a processor having further enhanced performance.

According to a sixth aspect of the present invention, a processor as defined in the fifth aspect of the present invention is provided. The first data-retaining unit permits first contained data to go out first, and the first data-retaining unit is designed to retain at most two pieces of data, while the second data-retaining unit is designed to retain at most a piece of data.

The address-generating unit generates an operation practice enable signal for controlling operation practice.

When each of the first and second data-retaining units retains at least a piece of data, then the first and second data-retaining units feed the first and second candidate operation data into the operating unit, respectively, in response to the operation practice enable signal.

The above structure allows the first and second data-retaining units, each of which has the smallest construction designed to retain such a small number of data, to provide the above beneficial effect that the first and second address signal-addressed data can be parallel-transferred at high frequency to the first and second data-retaining units, respectively, when such parallel transferred data are vector data having a lot of successive addressing.

As a result, a cost reduction and circuit downsizing are achievable.

According to a seventh aspect of the present invention, a processor as defined in the sixth aspect of the present invention is provided. When the same storage unit contains first and second address signal-addressed data at either the first storage area or the second storage area, and further when neither the first data-retaining unit nor the second data-retaining unit retains data, then the storage unit feeds the first address signal-addressed data into the first data-retaining unit.

The storage unit feeds the second address signal-addressed data into the second data-retaining unit when the same storage unit contains the first and second address signal-addressed data at either the first storage area or the second storage area, and further when the first data-retaining unit retains a piece of data, but the second data-retaining unit retain no data The storage unit feeds the first address signal-addressed data into the first data-retaining unit when the same storage units contains the first and second address signal-addressed data at either the first storage area or the second storage area, and further when the first data-retaining unit retains a piece of data while the second data-retaining unit retains data to be operated with the data held in the first data-retaining unit.

The storage unit feeds the second address signal-addressed data into the second data-retaining unit when the same storage unit contains the first and second address signal-addressed data at either the first storage area or the second storage area, and further when the first data-retaining unit retains two pieces of data while the second data-retaining unit retains data to be operated with one of the two pieces of data held in the first data-retaining unit.

The above structure realizes processing suitable for the first and second data-retaining units when they have the smallest construction designed to retain such a small number of data.

According to an eighth aspect of the present invention, in a processor as defined in the first, second, third, fourth, fifth, sixth, or seventh aspect of the present invention, the plurality of storage units is two storage units.

As a result, the processor according to the present invention is applicable as a processor including two source memories.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Embodiments of the present invention will now be described with reference to the drawings.

In order to achieve stringently required performance, the present invention focuses on data transfer, thereby providing a processor designed to suppress data transfer-caused loads to the utmost.

The processor herein refers to, e.g., a DSP (digital signal processor).

The present specification employs the term "to assert" which is meant to render something logically true.

Accordingly, the phrase, e.g., "to assert a signal" is meant to provide a logically true signal.

Embodiment 1

Figure 1:
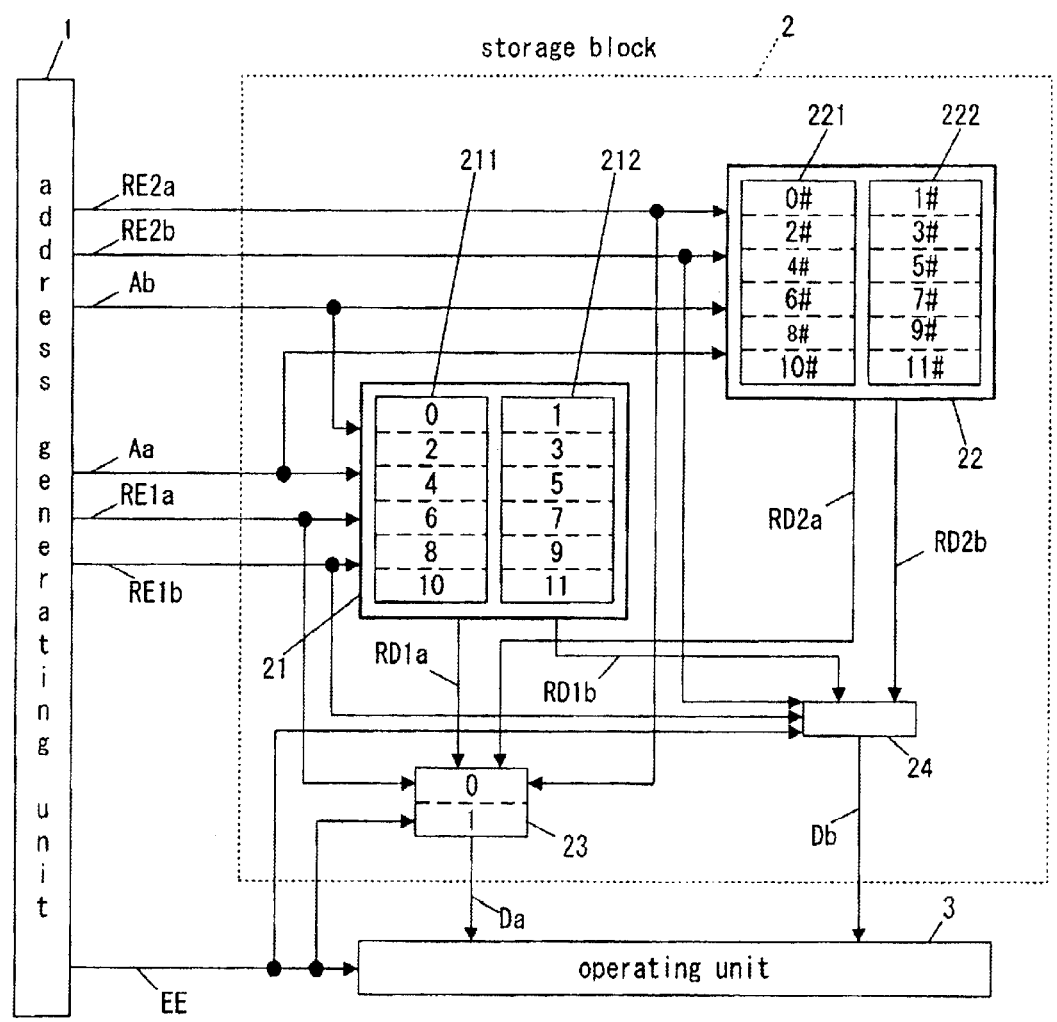
FIG. 1 is a block diagram illustrating an exemplary processor according to a first embodiment of the present invention.

FIG. 1 is a block diagram illustrating an exemplary processor according to a first embodiment of the present invention. As illustrated in FIG. 1, the processor includes an address-generating unit 1, a storage block 2, and an operating unit 3.

The storage block 2 includes a pair of source memories 21, 22, FIFO (a first-in first-out memory) 23, and a register 24.

The source memory 21 comprises a pair of memories 211, 212. The source memory 22 comprises a pair of memories 221, 222.

The following briefly describes how the above components behave.

The source memories 21, 22 of FIG. 1 store or contain data. The source memory 21 has a set of even-numbered addresses 0, 2, 4, 6, 8, 10 allocated to the memory 211 and a set of odd-numbered addresses 1, 3, 5, 7, 9, 11 allocated to the memory 212.

The source memory 22 has a set of even-numbered addresses 0#, 2#, 4#, 6#, 8#, 10# allocated to the memory 221 and a set of odd-numbered addresses 1#, 3#, 5#, 7#, 19#, 11# allocated to the memory 222.

In general, the source memory refers to a memory referenced by a computer (not shown). The operating unit 3 as illustrated in FIG. 1 includes the computer (not shown).

The FIFO 23 retains or contains readout data RD1a, RD2a that are supplied from the source memories 21, 22, respectively.

The FIFO 23 feeds the retained data as candidate operation data Da into the operating unit 3. The FIFO 23 permits first retained data to go out first.

The FIFO 23 is designed to retain two pieces of data.

The register 24 retains or contains readout data RD1b, RD2b that are fed from the source memories 21, 22, respectively.

The register feeds the retained data as candidate operation data Db into the operating unit 3.

The register is constructed to retain a piece of data.

The operating unit 3 operates the candidate operation data Da, Db that are supplied from the FIFO 23 and the register 24, respectively.

At this time, the FIFO 23 and the register 24 parallel-feed the candidate operation data Da, Db into the operating unit 3, respectively.

The address-generating unit 1 generates address signals Aa, Ab. The address signal Aa shows a storage position at which candidate operation data Da-yielding data is stored in one of the memories 21, 22. The address signal Ab shows a storage position at which candidate operation data Db-yielding data is stored in one of the memories 21, 22.

The address-generating unit 1 generates read enable signals RE1a, RE1b, RE2a, and RE2b. The read enable signal RE1a controls the output of the candidate operation data Da-yielding data (readout data RD1a) from the source memory 21. The read enable signal RE1b controls the output of the candidate operation data Db-yielding data (readout data RD1b) from the source memory 21. The read enable signal RE2a controls the output of the candidate operation data Da-yielding data (readout data RD2a) from the source memory 22. The read enable signal RE2b controls the output of the candidate operation data Db-yielding data (readout data RD2b) from the source memory 22.

The address-generating unit 1 generates the operation practice enable signal EE for control over operation practice.

The following briefly discusses successive processes ranging from the data readout to the operation practice with reference to a relationship between such processes and the signals provided by the address-generating unit 1.

When the read enable signal RE1a is asserted, then the source memory 21 sends out, as readout data RD1a, data that is stored at the storage position addressed by the address signal Aa.

When the read enable signal RE1b is asserted, then the source memory 21 sends out, as readout data RD1b, data that is stored at the storage position addressed by the address signal Ab. When the read enable signal RE2a is asserted, then the source memory 22 sends out, as readout data RD2a, data that is stored at the storage position addressed by the address signal Aa.

When the read enable signal RE2b is asserted, then the source memory 22 sends out, as readout data RD2b, data that is stored at the storage position addressed by the address signal Ab.

The readout data RD1a is written to the FIFO 23 when the read enable signal RE1a is asserted.

For example, the readout data RD1a is written to the FIFO 23 at a cyclic stage next to that in which the readout data RD1a is fed out of the memory 21 in response to the assertion of the read enable signal RE1a. See FIGS. 4, 6, and 8, which are described later.

The readout data RD1b is written to the register 24 when the read enable signal RE1b is asserted.

For example, the readout data RD1b is written to the register 24 at a cyclic stage next to that in which the readout data RD1b is fed out of the memory 21 in response to the assertion of the read enable signal RE1b. See FIGS. 6, and 8, which are described later The readout data RD2a is written to the FIFO 23 when the read enable signal RE2a is asserted.

For example, the readout data RD2a is written to the FIFO 23 at a cyclic stage next to that in which the readout data RD2a is fed out of the memory 22 in response to the assertion of the read enable signal RE2a.

The readout data RD2b is written to the register 24 when the read enable signal RE2b is asserted.

For example, the readout data RD2b is written to the register 24 at a cyclic stage next to that in which the readout data RD2b is fed out of the memory 22 in response to the assertion of the read enable signal RE2b. See FIG. 4, which is discussed later.

The FIFO 23 feeds the retained data as the candidate operation data Da into the operating unit 3 when the operation practice enable signal EE is asserted.

The register 24 feeds the retained data as the candidate operation data Db into the operating unit 3 when the operation practice enable signal EE is asserted.

At this time, the FIFO 23 and the register 24 supply the candidate operation data Da, Db in parallel with one another to the operating unit 3, respectively.

The operating unit 3 performs a desired operation on the parallel supplied candidate operation data Da, Db.

The way in which the processor behaves according to the present embodiment is now described in detail.

Pursuant to the present embodiment, the source memory 21 feeds the readout data RD1a, RD1b into the FIFO 23 and the register 24 at a certain timing, respectively. Similarly, the source memory 22 feeds the readout data RD2a, RD2b into the FIFO 23 and the register 24 at a certain timing, respectively. Such timing is varied, depending upon the presence of contention on access to the memories 211,212,221, and 222, and further upon respectively states in which the FIFO 23 and the register 23 are situated.

Initially, the presence of contention on access to the memories 211, 212, 221, and 222 is described.

As previously described, the address-generating unit 1 sends out, as the address signal Aa, an address at which data to be read out as candidate operation data Da is contained in one of the source memories 21, 22.

The address-generating unit 1 sends out, as the address signal Ab, an address at which data to be read out as candidate operation data Db is contained in one of the source memories 21, 22.

Assume that the source memory 21 contains such two different pieces of data to be read out by the address signals Aa, Ab, respectively, and further that the two different pieces of data are both located at either the memory 211 or the memory 212. In this instance, the action of reading the two different pieces of data is called the presence of contention on access to either the memory 211 or the memory 212.

Similarly, assume that the source memory 22 contains such two different pieces of data to be read out by the address signals Aa, Ab, respectively, and further that the two different pieces of data are both positioned at either the memory 221 or the memory 222, the action of reading the two different pieces of data is called the presence of contention on access to either the memory 221 or the memory 222.

The following describes a relationship between the presence of contention on access to the memories 211, 212, 221, and 222 and respective states in which the FIFO 23 and the register 24 are situated.

Figure 2:
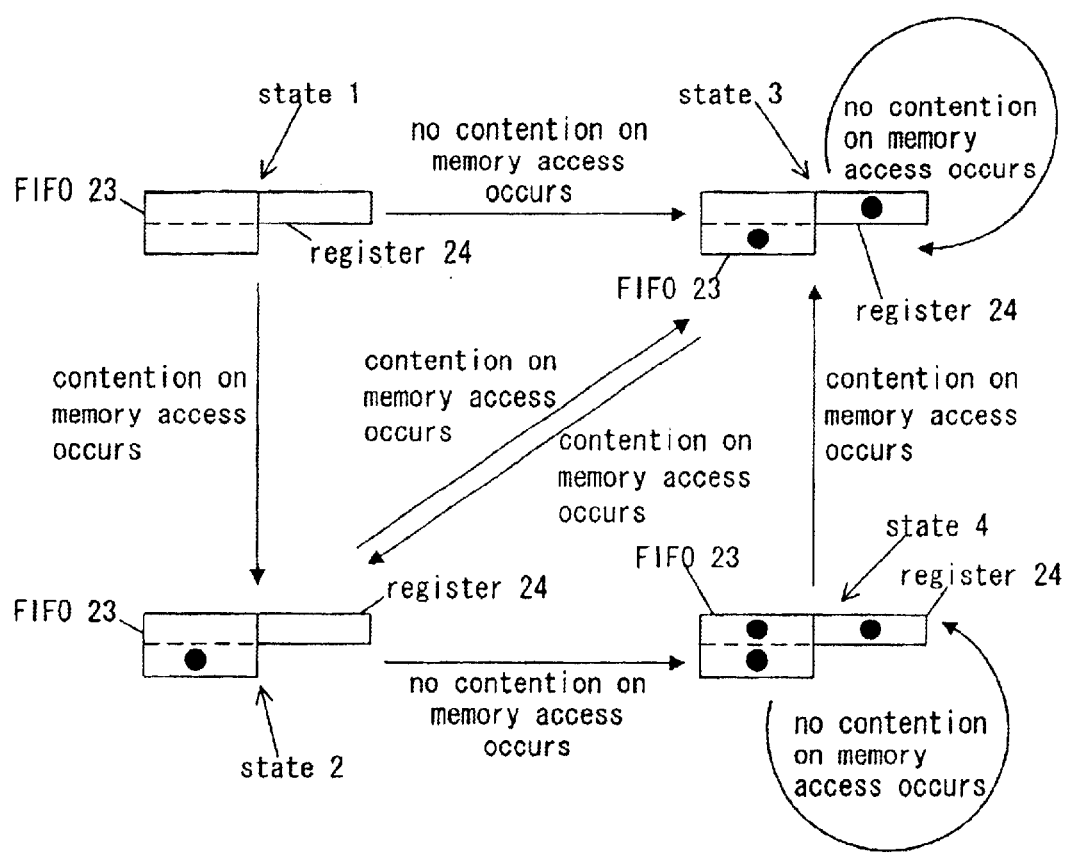
FIG. 2 is a descriptive illustration showing a relationship between a state of a FIFO and register and the presence of contention on memory access.

FIG. 2 is a descriptive illustration, showing the above-described relationship.

In FIG. 2, the symbol "●" refers to a state in which the FIFO 23 or the register 24 retain data.

As illustrated in FIG. 2, a state in which neither the FIFO 23 nor the register 24 maintains data is referred to as "state 1".

A state in which the FIFO 23 retains a piece of data, but the register 24 holds no data is referred to as "state 2".

A state in which each of the FIFO 23 and the register 24 retains a piece of data is called "state 3".

A state in which the FIFO 23 holds two pieces of data, while the register 24 maintains a piece of data is called "state 4".

With continued reference to FIG. 2, when the FIFO 23 and the register 24 are in state 1, and further when contention on memory access occurs, then the output of the readout data RD1a, RD1b, RD2a, and RD2b is controlled to put the FIFO 23 and the register 24 into state 2.

When the FIFO 23 and the register 24 are in state 1, and further when no contention on memory access occurs, then the output of the readout data RD1a, RD1b, RD2a, and RD2b is controlled to put the FIFO 23 and the register 24 into state 3.

When the FIFO 23 and the register 24 are in state 2, and further when contention on memory access occurs, then the output of the readout data RD1a, RD1b, RD2a, and RD2b is controlled to put the FIFO 23 and the register 24 into state 3.

When the FIFO 23 and the register 24 are in state 2, and further when no contention on memory access occurs, then the output of the readout data RD1a, RD1b, RD2a, and RD2b is controlled to bring the FIFO 23 and the register 24 into state 4.

When the FIFO 23 and the register 24 are in state 3, and further when contention on memory access occurs, then the output of the readout data RD1a, RD1b, RD2a, and RD2b is controlled to put the FIFO 23 and the register 24 into state 2.

When the FIFO 23 and the register 24 are in state 3, and further when no contention on memory access occurs, then the output of the readout data RD1a, RD1b, RD2a, and RD2b is controlled to maintain the FIFO 23 and register 24 in state 3.

When the FIFO 23 and the register 24 are in state 4, and further when contention on memory access occurs, then the output of the readout data RD1a, RD1b, RD2a, and RD2b is controlled to put the FIFO 23 and the register 24 into state 3.

When the FIFO 23 and the register 24 are in state 4, and further when no contention on memory access occurs, then the output of the readout data RD1a, RD1b, RD2a, and RD2b is controlled to maintain the FIFO 23 and register 24 in state 4.

The above-described control over the output of the readout data RD1a, RD1b, RD2a, and RD2b is executed by the signals from the address-generating unit 1, i.e., the address signals Aa, Ab, the read enable signals RE1a, RE1b, RE2a, RE2b, and the operation practice enable signal EE.

The above is now discussed in detail with reference to FIGS. 1 and 2.

Initially, conditions to renew the address signals Aa, Ab are described.

The address-generating unit 1 renews the address signal Aa in response to the assertion of the read enable signal RE1a.

For example, the address-generating unit 1 renews the address signal Aa when the read enable signal RE1a is asserted, and further when the readout data RD1a is fed out of the source memory 21. See FIGS. 4, 6, and 8, which are discussed later.

The address-generating unit 1 renews the address signal Aa in response to the assertion of the read enable signal RE2a.

For example, the address-generating unit 1 renews the address signal Aa when the read enable signal RE2a is asserted, and further when the readout data RD2a is fed out of the source memory 22.

The address-generating unit 1 renews the address signal Ab in response to the assertion of the read enable signal RE1b.

For example, the address-generating unit 1 renews the address signal Ab when the read enable signal RE1b is asserted, and further when the readout data RD1b is fed out of the source memory 21. See FIGS. 6 and 8, which are discussed later.

The address-generating unit 1 renews the address signal Ab in response to the assertion of the read enable signal RE2b.

For example, the address-generating unit 1 renews the address signal Ab when the read enable signal RE2b is asserted, and further when the readout data RD2b is fed out of the source memory 22. See FIG. 4, which is to be discussed later.

The following discusses conditions to assert the operation practice enable signal EE.

The address-generating unit 1 asserts the operation practice enable signal EE when each of the FIFO 23 and the register 24 retains at least a piece of data.

The following discusses conditions to assert the read enable signals RE1a, RE1b, RE2a, and RE2b.

The address-generating unit 1 asserts the read enable signals RE1a, RE2b when the source memories 21, 22 contain two different pieces of data to be read out by the address signals Aa, Ab, respectively.

As a result, the readout data RD1a, RD2b are supplied to the FIFO 23 and the register 24, respectively.

In this situation, no contention on memory access occurs. Consequently, as illustrated in FIG. 2, the FIFO 23 and register 24 in state 1 are put into state 3; the FIFO 23 and register 24 in state 2 are put into state 4; the FIFO 23 and register 24 in state 3 are maintained in state 3; and the FIFO 23 and register 24 in state 4 are maintained in state 4.

The reason why the FIFO 23 and register 24 in state 3 are held in state 3, and the FIFO 23 and register 24 in state 4 are held in state 4 is that the operating-executing enable signal EE is asserted when each of the FIFO 23 and the register 24 retains at least a piece of data, with the result that the respective data are fed out of the FIFO 23 and the register 24 into the operating unit 3.

The address-generating unit 1 asserts the read enable signals RE2a, RE1b when the source memory 22 contains a piece of data to be read out by the address signal Aa, while the source memory 21 contains another piece of data to be read out by the address signal Ab.

As a result, the readout data RD2a, RD1b are supplied to the FIFO 23 and the register 24, respectively.

In this instance, no contention on memory access occurs. Consequently, as illustrated in FIG. 2, the FIFO 23 and register 24 in state 1 are put into state 3; the FIFO 23 and register 24 in state 2 are brought into state 4; the FIFO 23 and register 24 in state 3 remain in state 3; and the FIFO 23 and register 24 in state 4 are held in state 4.

The address-generating unit 1 asserts the read enable signals RE1a, RE1b when the source memory 21 includes two different pieces of data to be read out by the address signals Aa, Ab, and further when the two different pieces of data are contained at the memories 211, 212, respectively.

As a result, the readout data RD1a, RD1b are supplied to the FIFO 23 and the register 24, respectively.

In this instance, no contention on memory access occurs. Consequently, as illustrated in FIG. 2, the FIFO 23 and register 24 in state 1 are put into state 3; the FIFO 23 and register 24 in state 2 are put into state 4; the FIFO 23 and register 24 in state 3 are held in state 3; the FIFO 23 and register 24 in state 4 are maintained in state 4.

The address-generating unit 1 asserts the read enable signal RE1a when the source memory 21 includes two different pieces of data to be read out by the address signals Aa, Ab, when the two different pieces of data are contained at either the memory 211 or the memory 212, and further when the FIFO 23 and the register 24 are in either state 1 or state 3 as illustrated in FIG. 2.

As a result, the readout data RD1a is supplied to the FIFO 23. In this situation, contention on memory access occurs. Consequently, as illustrated in FIG. 2, the FIFO 23 and register 24 in state 1 are put into state 2, while the FIFO 23 and register 24 in state 3 are brought into state 2.

The reason why the FIFO 23 and register 24 in state 3 are put into state 2 is that the operating-executing enable signal EE is asserted when each of FIFO 23 and the register 24 retains at least a piece of data, with the result that the respective data are fed out of the FIFO 23 and the register 24 into the operating unit 3.

The address-generating unit 1 asserts the read enable signal RE1b when the source memory 21 includes two different pieces of data to be read out by the address signals Aa, Ab, when the two different pieces of data are contained at either the memory 211 or the memory 212, and further when the FIFO 23 and the register 24 are in either state 2 or state 4 as illustrated in FIG. 2.

As a result, the readout data RD1b is supplied to the register 24. In this situation, contention on memory access occurs. Consequently, as illustrated in FIG. 2, the FIFO 23 and register 24 in state 2 is put into state 3, and the FIFO 23 and register 24 in state 4 are put into state 3.

The reason why the FIFO 23 and register 24 in state 4 are put into state 3 is that the operation practice enable signal EE is asserted when each of the FIFO 23 and the register 24 retains at least a piece of data, with the result that the respective data are fed out of the FIFO 23 and the register 24 into the operating unit 3.

The address-generating unit 1 asserts the read enable signals RE2a, RE2b when the source memory 22 includes two different pieces of data to be read out by the address signals Aa, Ab, and further when the two different pieces of data are contained at the memories 221, 222, respectively.

As a result, the readout data RD2a, RD2b are supplied to the FIFO 23 and the register 24, respectively.

In this situation, no contention on memory access occurs. Consequently, as illustrated in FIG. 2, the FIFO 23 and register 24 in state 1 are put into state 3; the FIFO 23 and register 24 in state 2 are put into state 4; the FIFO 23 and register 24 in state 3 are maintained in state 3; and the FIFO 23 and register 24 in state 4 are held in state 4.

The address-generating unit 1 asserts the read enable signals RE2a when the source memory 22 includes two different pieces of data to be read out by the address signals Aa, Ab, when the two different pieces of data are contained at either the memory 221 or the memory 222, and further when the FIFO 23 and the register 24 are in either state 1 or state 3 as illustrated in FIG. 2.

As a result, the readout data RD2a is supplied to the FIFO 23. In this situation, contention on memory access occurs. Consequently, as illustrated in FIG. 2, the FIFO 23 and register 24 in state 1 are brought into state 2, while the FIFO 23 and register 24 in state 3 are brought into state 2.

The address-generating unit 1 asserts the read enable signals RE2b when the source memory 22 includes two different pieces of data to be read out by the address signals Aa, Ab, when the two different pieces of data are contained at either the memory 221 or the memory 222, and further when the FIFO 23 and the register 24 are in either state 2 or state 4, as illustrated in FIG. 2.

As a result, the readout data RD2b is supplied to the register 24. In this situation, contention on memory access occurs. Consequently, as illustrated in FIG. 2, the FIFO 23 and register 24 in state 2 are brought into state 3, while the FIFO 23 and register in state 4 are put into state 3.

The way in which the data are read out depending upon how the source, memories 21, 22 contain the data is now described with reference to specific examples.

Figure 3:
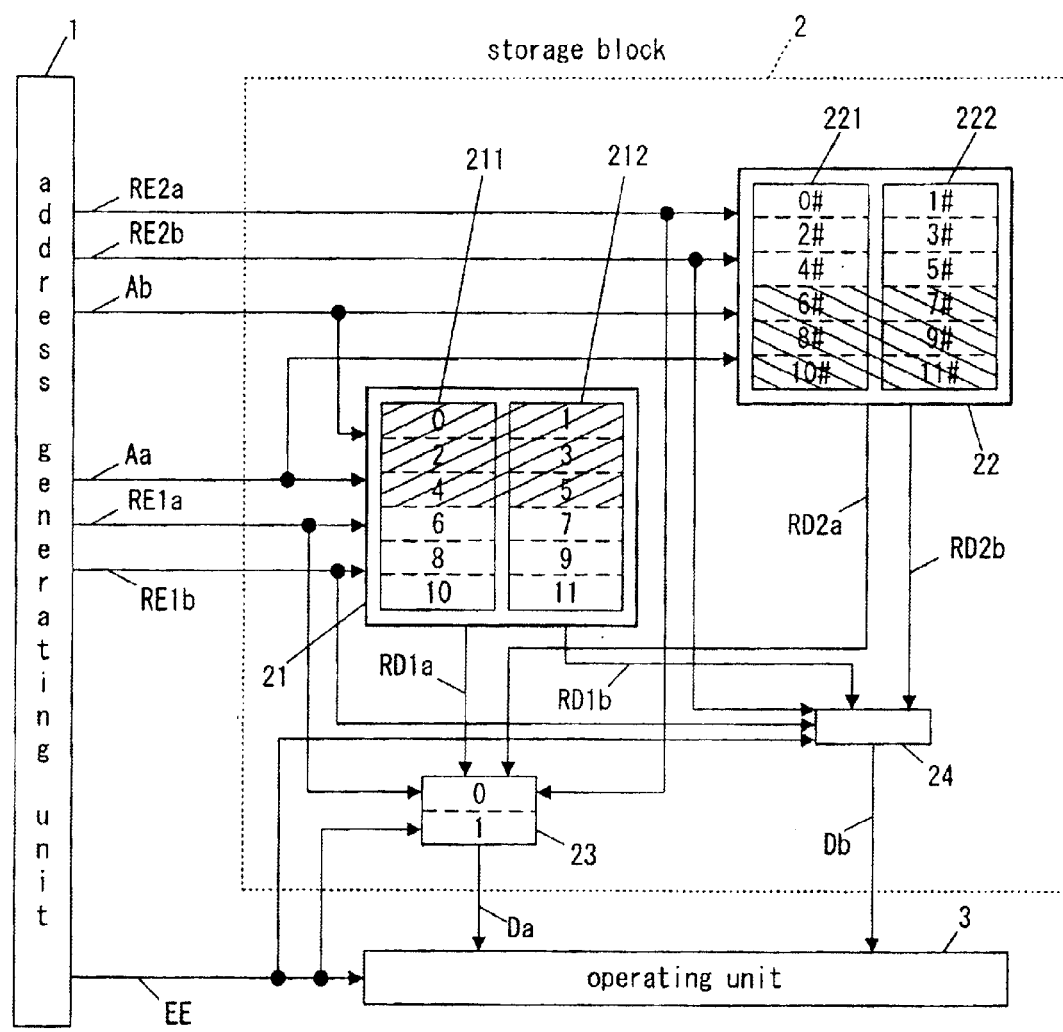
FIG. 3 is a descriptive illustration showing different sets of data contained in different source memories, respectively.

FIG. 3 is a descriptive illustration showing a set of candidate operation data Da-yielding data and a set of candidate operation data Db-yielding data contained in the source memories 21 and 22, respectively.

Figure 4:
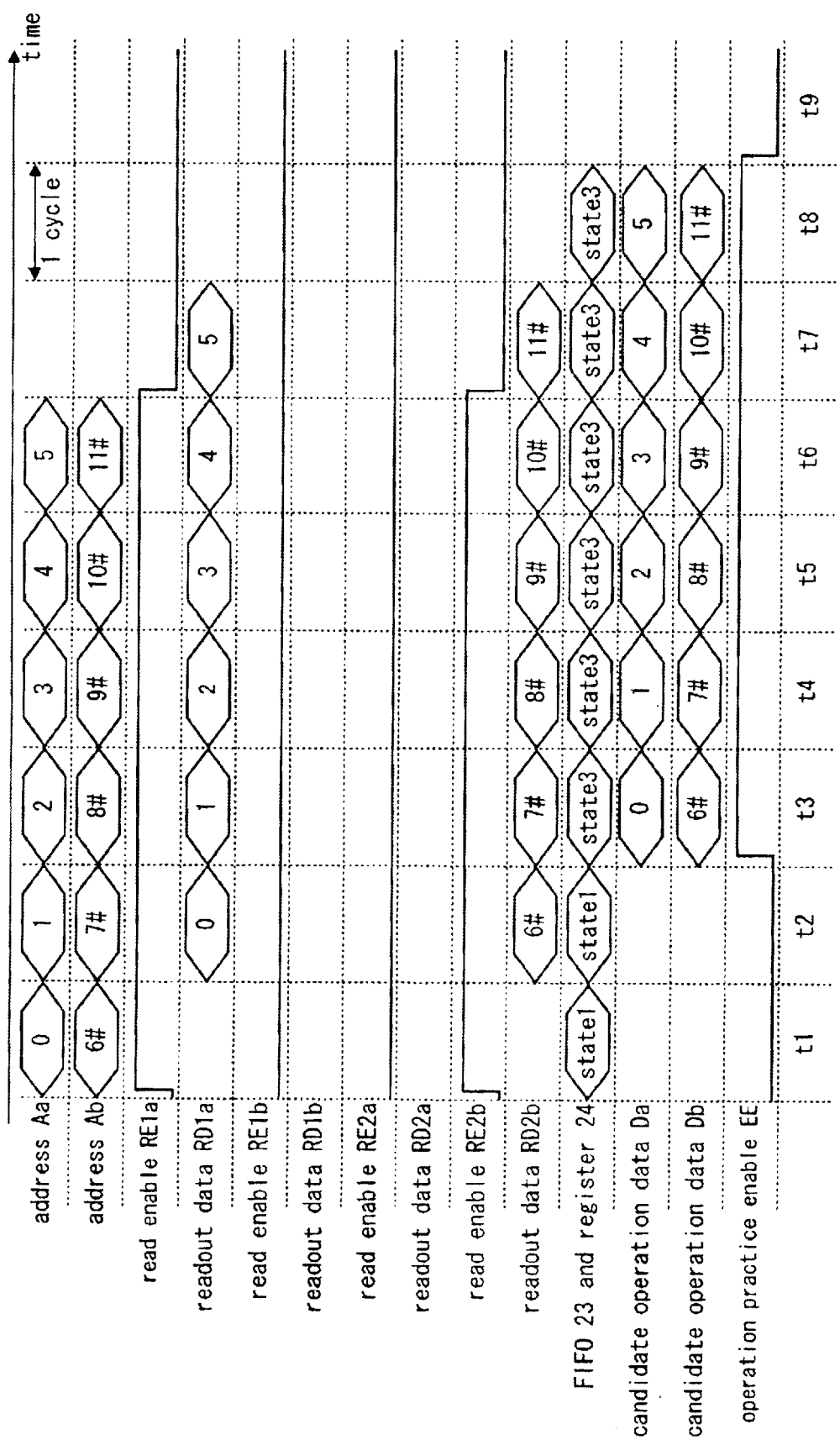
FIG. 4 is a timing diagram illustrating how the data of FIG. 3 are read out.

FIG. 4 is a timing diagram showing how the data as illustrated in FIG. 3 are read out.

As illustrated in FIG. 3, when the source memory 21 contains a series of candidate operation data Da-yielding data 0, 1, 2, 3, 4, and 5, and further when the source memory 22 contains a series of candidate operation data Db-yielding data 6#, 7#, 8#, 9#, 10#, and 11#, then no contention on memory access occurs. In this instance, the data are read out in a manner as described below.

As illustrated in FIG. 4, at time "t1", the address-generating unit 1 asserts the read enable signals RE1a, RE2b.

At time "t2", data 0 is fed as readout data RD1a from the source memory 21 into the FIFO 23 in response to the assertion of the read enable signals RE1a, while data 6# is fed as readout data RD2b from the source memory 22 into the register 24 in response to the assertion of the read enable signal RE2b.

At time "t3", the FIFO 23 and the register 24 retain data 0 and 6#, respectively. As a result, the FIFO 23 and the register 23 in state 1 are put into state 3 as illustrated in FIG. 2.

At time "t3", the address-generating unit 1 asserts the operation practice enable signal EE in substantially simultaneous with the moment when the FIFO 23 and the register 23 hold data 0 and 6#, respectively.

At time "t3", the FIFO 23 and the register 24 parallel-feed the retained data 0, 6# as the candidate operation data Da, Db into the operating unit 3, respectively, in substantially concurrent with the assertion of the operation practice enable signal EE.

Concurrently, at time "t3", data 1 is fed as readout data RD1a from the source memory 21 into the FIFO 23, while data 7# is fed as readout data RD2b from the source memory 22 into the register. 24.

At time "t2", the address signal Aa indicative of address 0 is renewed to show address 1 because data 0 is fed as readout data RD1a from the source memory 21 into the FIFO 23 in response to the assertion of the read enable signal RE1a.

In addition, at time "t2", the address signal Ab indicative of address 6# is renewed to show address 7# because data 6# is fed as readout data RD2b into the register 24 from the source memory 22 in response to the assertion of the read enable signal RE2b.

Similarly, the source memory 21 feeds the remaining data 2–5 in sequence into the FIFO 23, while the source memory 22 sequentially feeds the remaining data 8#–11# into the register 24. Each of the data 2–5 and each of the data 8#–11# are supplied in parallel with one another to the operating unit 3, at which such parallel-entered data are computed.

A next example is described.

Figure 5:
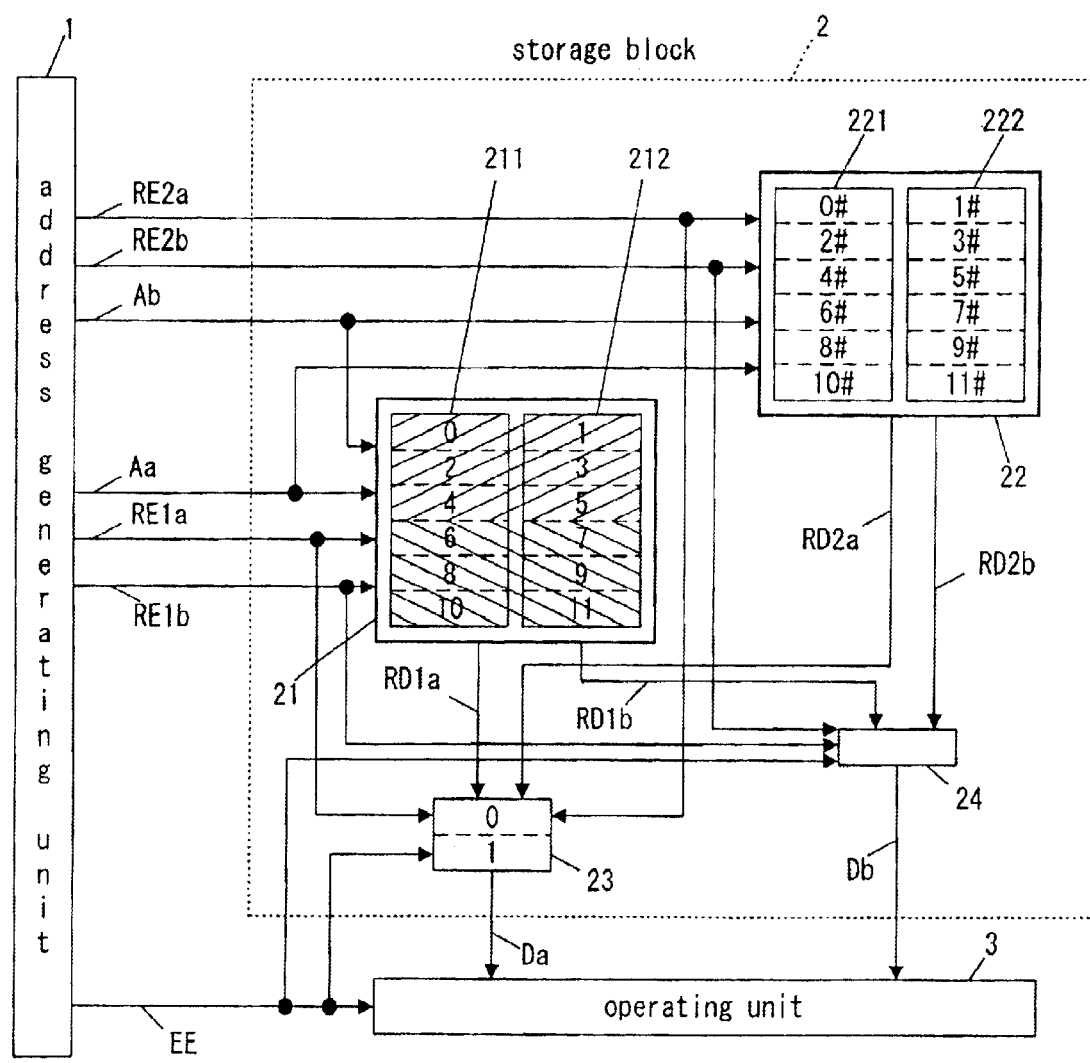
FIG. 5 is a descriptive illustration showing two different sets of data contained in the same source memory.

FIG. 5 is a descriptive illustration showing the source memory 21 that contains a set of candidate operation data Da-yielding data and a set of candidate operation data Db-yielding data.

Figure 6:
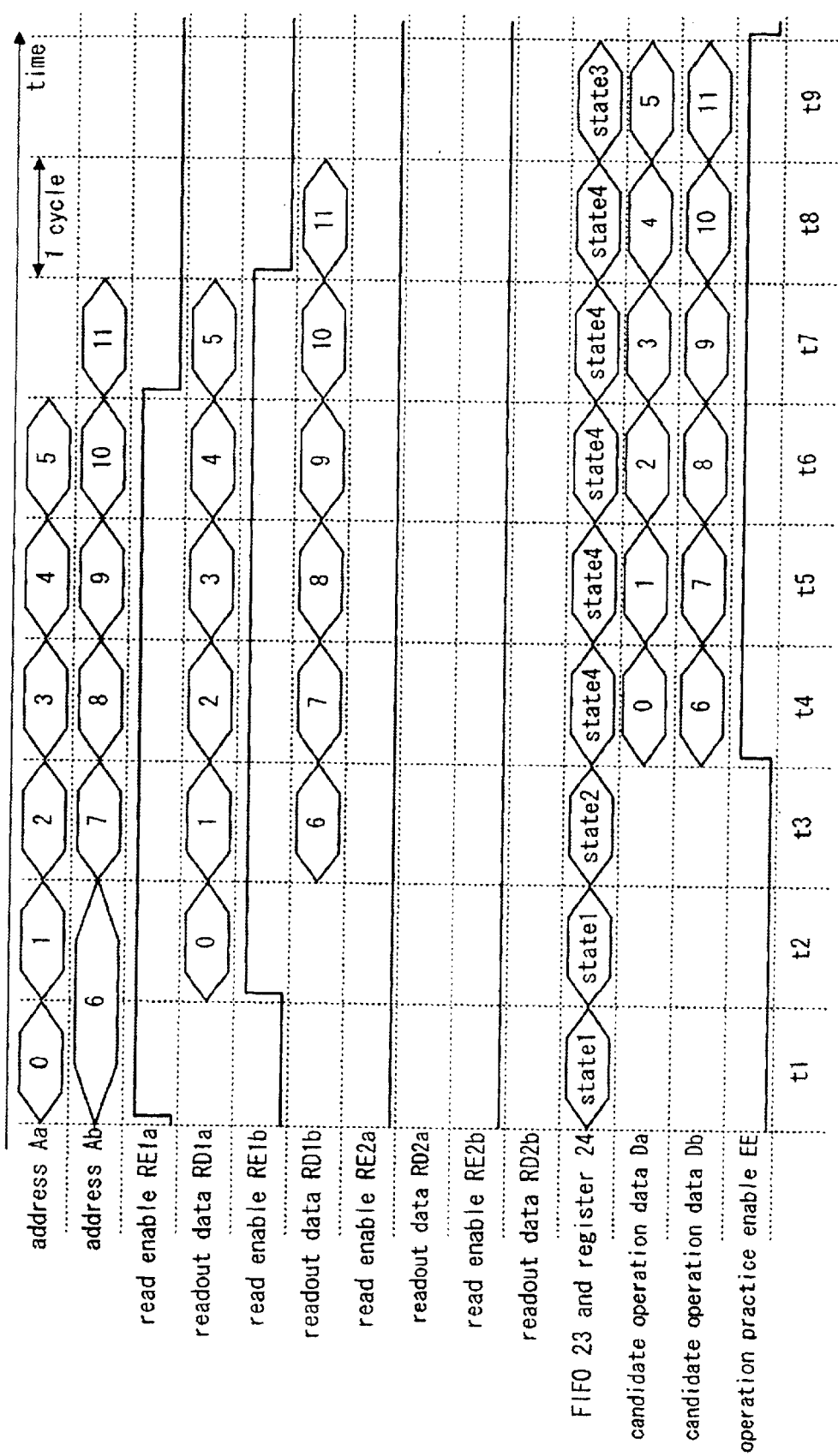
FIG. 6 is a timing diagram illustrating the data of FIG. 5 are read out.

FIG. 6 is a timing diagram illustrating how the data as shown in FIG. 5 are read out.

As illustrated in FIG. 5, the source memory 21 contains a series of candidate operation data Da-yielding data 0, 2, 4 and a series of candidate operation data Db-yielding data 6, 8, 10 at the memory 211, while containing a series of candidate operation data Da-yielding data 1, 3, 5 and a series of candidate operation data Db-yielding data 7, 9, 11 at the memory 212.

Referring to FIG. 6, at time "t1", the address signals Aa, Ab show addresses 0, 6, respectively. This means that there occurs contention on access to the memory 211.

More specifically, the memory 211, one of the pair of memories for forming the source memory 21, includes data 0 and 6 that are read out at time "t1" by address 0 as address signal Aa and address 6 as address signal Ab, respectively.

At time "t1", the FIFO 23 and the register 24 are in state 1.

Accordingly, at time "t1", the read enable signal RE1a is asserted.

At time "t2", data 0 is fed as readout data RD1a into the FIFO 23 from the memory 211 in response to the assertion of the read enable signal RE1a.

At time "t3", the FIFO 23 holds data 0. As a result, the FIFO 23 and register 24 in state 1 are put into state 2.

At time "t2", the address signals Aa and Ab show addresses 1 and 6, respectively. This means that no contention on memory access occurs.

Accordingly, at time "t2", the read enable signal RE1b is asserted.

At time "t3", data 6 is fed as readout data RD1b into the register 24 from the memory 211 in response to the assertion of the read enable signal RE1b.

Concurrently, at time "t3", data 1 is fed as readout data RD1a into the FIFO 23 from the memory 212.

At time "t2", the address signal Aa representative of address 0 is renewed to show address 1 because data 0 is fed as readout data RD1a from the source memory 211 in response to the assertion of the read enable signal RE1a.

Meanwhile, at time "t2", the address signal Ab is not renewed, but remains as address 6 because the readout data RD1b is not fed out of the source memory 21 while the read enable signal RE1b is asserted.

At time "t4", the FIFO 23 and the register 24 hold data 1 and 6, respectively. As a result, the FIFO 23 and register 24 in state 2 are put into state 4.

At time "t4", the address-generating unit 1 asserts the operation practice enable signal EE substantially simultaneous with the moment when the register 24 retains data 6.

At time "t4", the FIFO 23 and the register 24 parallel-feed the retained data 0,6 as candidate operation data Da, Db into the operating unit 3, respectively, substantially concurrent with the assertion of the operation practice enable signal EE.

Concurrently, at time "T4", data 2 is fed as readout data RD1a into the FIFO 23 from the memory 211, while data 7 is fed as readout data RD1b into the register 24 from the memory 212.

At time "t3", the address signal Aa indicative of address 1 is renewed to show address 2 because data 1 is fed as readout data RD1a into the FIFO 23 from the memory 212 in response to the assertion of the read enable signal RE1a In addition, at time "t3", the address signal Ab indicative of address 6 is renewed to show address 7 because data 6 is fed as readout data RD1b into the register 24 from the memory 211 in response to the assertion of the read enable signal RE1b.

Similarly, the remaining data 3–5 are fed in sequence from the source memory 21 into the FIFO 23, while the remaining data 8–11 are sequentially fed from the source memory 21 into the register 24. Each of the data 3–5 and each of the data 8–11 are supplied in parallel with one another to the operating unit 3, at which such parallel-supplied data are computed.

As described above, the address signal Aa and the read enable signals RE1a, RE2a are generated in connection with the candidate operation data Da, while the address signal Ab and the read enable signals RE1b, RE2b are generated in connection with the candidate operation data Db. As a result, data output from the source memories 21, 22 are controllable for each data to be operated, not for each of the source memories 21, 22.

Consequently, even when the same source memory stores the candidate operation data Da-yielding data and the candidate operation data Db-yielding data, the candidate operation data Da-yielding data and the candidate operation data Db-yielding data can be fed into the FIFO 23 and the register 24, respectively, without the need for transferring the data to another source memory.

As a result, data transfer-caused loads can be inhibited, and high-speed processing is achievable. This feature provides an operating apparatus having enhanced performance.

Another feature is that the inhibited data transfer-caused loads allow the processor to consume a reduced quantity of electric power.

Figure 10:
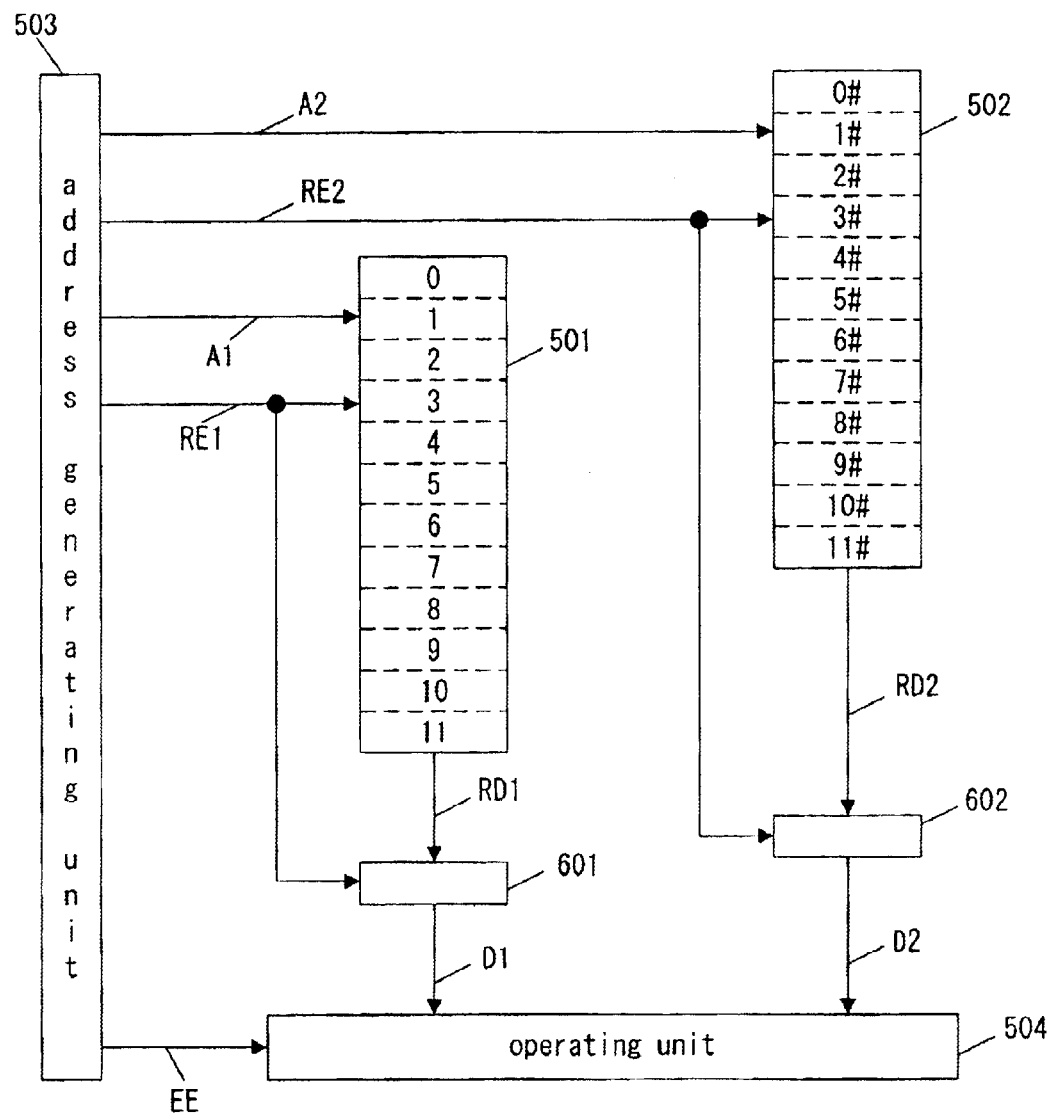
FIG. 10 is a block diagram illustrating a prior art processor.
Figure 11:
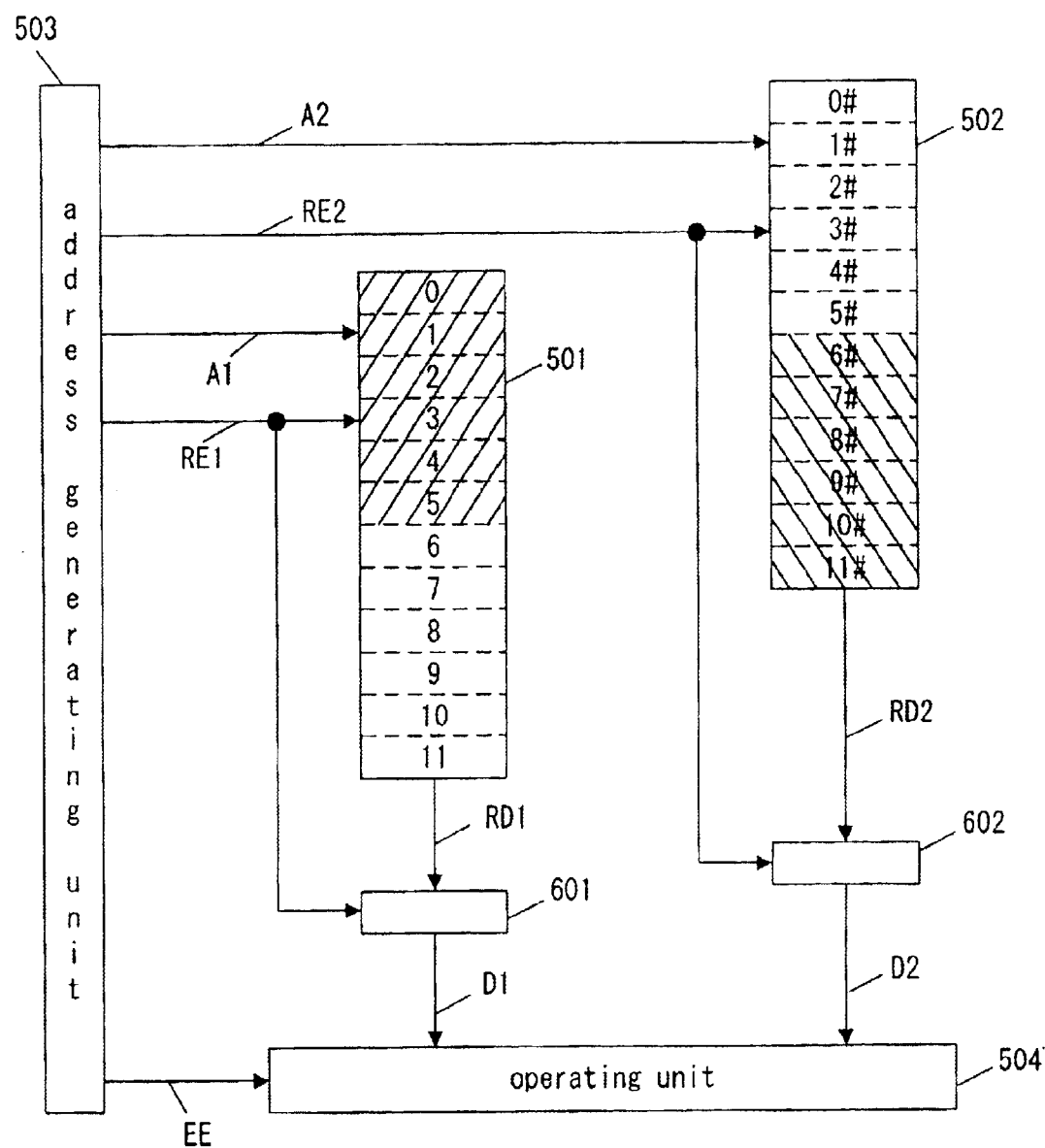
FIG. 11 is a descriptive illustration showing different sets of data contained in different source memories, respectively.
Figure 12:
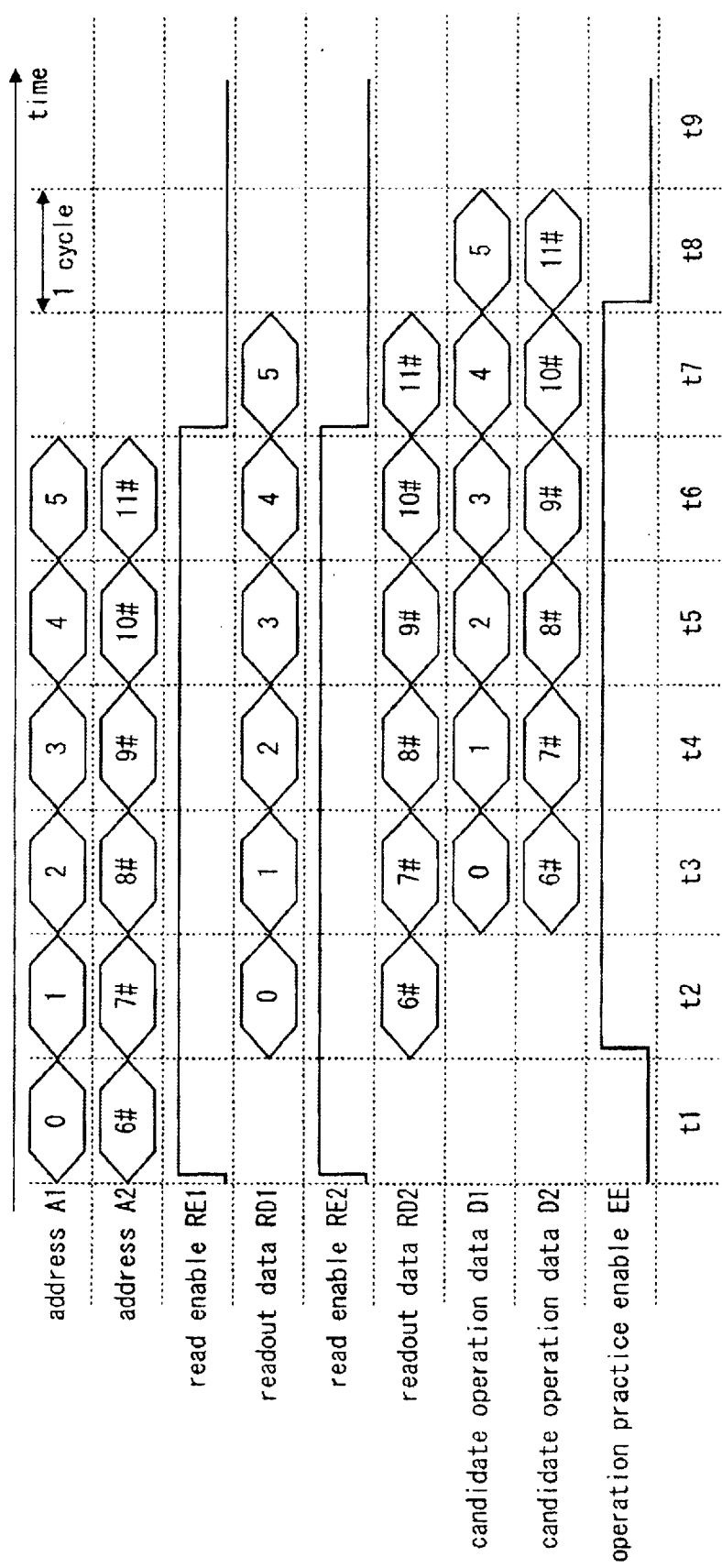
FIG. 12 is a timing diagram, illustrating how the data of FIG. 11 are read out.

As illustrated in FIG. 10, a prior art processor produces address signals A1, A2 and read enable signals RE1, RE2 for each source memory 501, 502. As a result, data output is controllable only with each of the source memories 501, 502.

Figure 13:
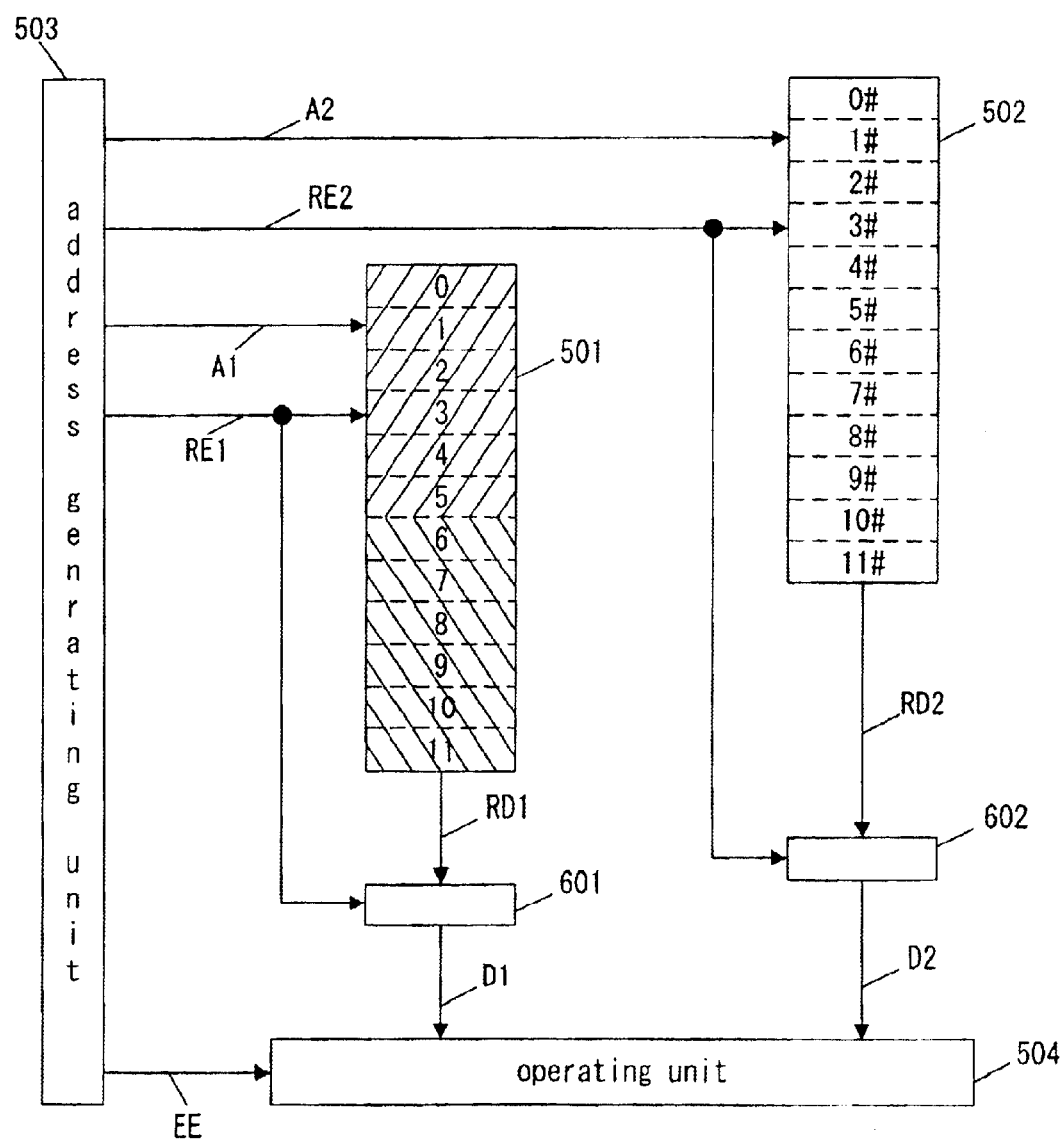
FIG. 13 is a descriptive illustration showing different sets of data contained in the same source memory.
Figure 14:
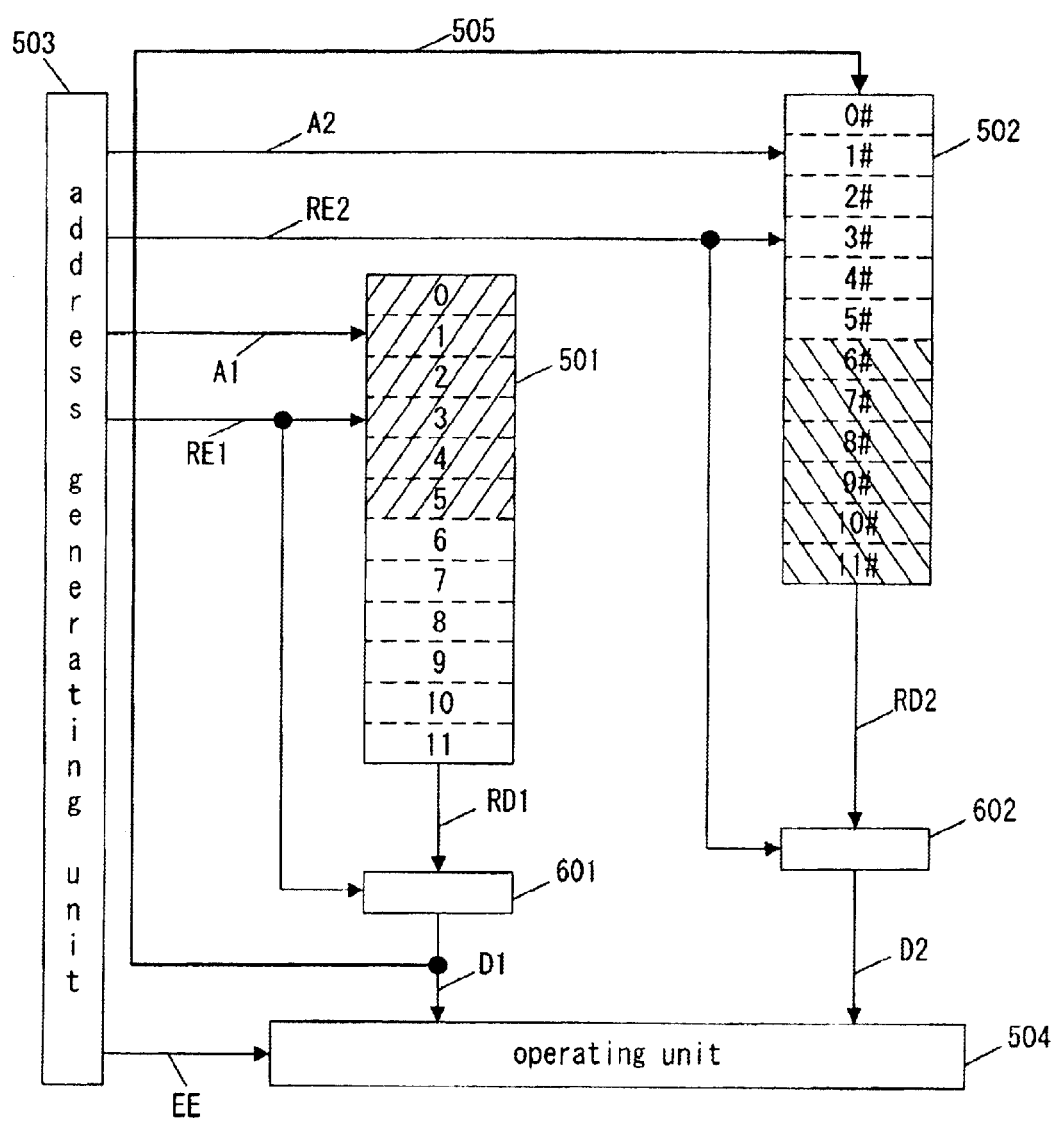
FIG. 14 is a descriptive illustration, showing the data of FIG. 13 are read out.

Accordingly, the prior art processor requires data transfer as illustrated in FIG. 14 when storing data in a manner as illustrated in FIG. 13.

As described above, pursuant to the present embodiment, the source memory 21 consists of the memories 211, 212 in which a set of even-numbered addresses and a set of odd-numbered addresses are allocated to the memories 211 and 212, respectively.

The source memory 22 consists of the memories 221, 222 in which a set of even-numbered addresses and a set of odd-numbered addresses are allocated to the memories 221 and 222, respectively.

Consequently, even when the same source memory stores candidate operation data Da-yielding data and candidate operation data Db-yielding data, the candidate operation data Da-yielding data and the candidate operation data Db-yielding data can be parallel-transferred with high frequency to the FIFO 23 and the register 24, respectively, when such stored data are vector data having a lot of successive addressing.

As a result, when the source memory stores the vector data having a lot of successive addressing, then higher-speed processing is achievable. This feature provides a processor having further increased performance.

For example, referring to FIG. 1, assume that the source memory 21 has a series of candidate operation data Da-yielding data contained at addresses 04 and a series of candidate operation data Db-yielding data included at addresses 5–9. In this instance, the candidate operation data Da-yielding data and the candidate operation data Db-yielding data can be parallel-transferred to the FIFO 23 and the register 24, respectively.

Furthermore, as described above, according to the present embodiment, when the source memory 21 stores the address signal Aa-addressed data and the address signal Ab-addressed data at either the memory 211 or the memory 212, and further when neither the FIFO 23 nor the register 24 retain data (in other words, when the FIFO 23 and the register 24 are in state 1, and further when contention on memory access occurs), then the source memory 21 feeds the address signal Aa-addressed data into the FIFO 23.

Alternatively, when the source memory 22 includes the address signal Aa-addressed data and the address signal Ab-addressed data at either the memory 221 or the memory 222, and further when neither the FIFO 23 nor the register 24 retain data (in other word, when the FIFO 23 and the register 24 are in state 1, and further when contention on memory access occurs), then the source memory 22 feeds the address signal Aa-addressed data into the FIFO 23.

When the source memory 21 contains the address signal Aa-addressed data and the address signal Ab-addressed data at either the memory 211 or the memory 212, and further when the register 24 does not retain data to be operated with every data held in the FIFO 23 (in other words, when the FIFO 23 and the register 24 are in state 2 of FIG. 2, and further when contention on memory access occurs), then the source memory 21 feeds the address signal Ab-addressed data into the register 24.

Alternatively, when the source memory 22 contains the address signal Aa-addressed data and the address signal Ab-addressed data at either the memory 221 or the memory 222, and further when the register 24 does not retain data to be operated with every data held in the FIFO 23 (in other words, when the FIFO 23 and the register 24 are in state 2 of FIG. 2, and further when contention on memory access occurs), then the source memory 22 feeds the address signal Ab-addressed data into the register 24.

When the source memory 21 contains the address signal Aa-addressed data and the address signal Ab-addressed data at either the memory 211 or the memory 212, and further when the register 24 always retains data to be operated with data retained in the FIFO 23 (in other words, when the FIFO 23 and the register 24 are in state 3 of FIG. 2, and further when contention on memory access occurs), then the source memory 21 feeds the address signal Aa-addressed data into the FIFO 23.

Alternatively, when the source memory 22 includes the address signal Aa-addressed data and the address signal Ab-addressed data at either the memory 221 or the memory 222, and further when the register 24 always retains data to be operated with data retained in the FIFO 23 (in other words, when the FIFO 23 and the register 24 are in state 3 of FIG. 2, and further when contention on memory access occurs), then the source memory 22 feeds the address signal Aa-addressed data into the FIFO 23.

When the source memory 21 includes the address signal Aa-addressed data and the address signal Ab-addressed data at either the memory 211 or the memory 212, and further when the register 24 does not retain data to be operated with any data among several pieces of data held in the FIFO 23 (in other words, when the FIFO 23 and the register 24 are in state 4 of FIG. 2, and further when contention on memory access occurs), then the source memory 21 feeds the address signal Ab-addressed data into the register 24.

Alternatively, when the source memory 22 contains the address signal Aa-addressed data and the address signal Ab-addressed data at either the memory 221 or the memory 222, and further when the register 24 does not retain data to be operated with any data among several pieces of data held in the FIFO 23 (in other words, when the FIFO 23 and the register 24 are in state 4 of FIG. 2, and further when contention on memory access occurs), then the source memory 22 feeds the address signal Ab-addressed data into the register 24.

As described above, when the address signal Aa-addressed data and the address signal Ab-addressed data are contained in the source memory 21 at either the memory 211 or the memory 212, or alternatively in the source memory 22 at either the memory 221 or the memory 222, then the source memory 21 or otherwise the source memory 22 at first feeds any data into either the FIFO 23 or the register 24. In this way, the timing of data output into the FIFO 23 and the register 24 is adjusted.

In addition to the above timing adjustment, the source memories 21, 22 have a series of even-numbered addresses allocated to the memory 211 and a series of even-numbered addresses allocated to the memory 221, respectively. The source memories 21, 22 have a series of odd-numbered addresses allocated to the memory 212 and a series of odd-numbered addresses allocated to the memory 222, respectively.

As a result, after the timing of data output into the FIFO 23 and the register 24 is adjusted, the address signal Aa-addressed data and the address signal Ab-addressed data can be parallel-transferred to the FIFO 23 and the register 24, respectively, when the transferred data are vector data having a lot of successive addressing.

As described above, the address signal Aa-addressed data and the address signal Ab-addressed data can be parallel-transferred with high frequency to the FIFO 23 and the register 24, respectively, when the transferred data are the vector data having a lot of successive addressing.

This feature realizes higher-speed processing, and thus provides a processor having further increased performance.

Furthermore, according to the present embodiment, the FIFO 23 is designed to allow the first contained data to go out the first, and further to retain at most two pieces of data. The register 24 can retain at most a piece of data.

When the FIFO 23 and the register 24 each retain at least a piece of data, then the FIFO 23 and the register 24 feed the respective candidate operation data Da, Db into the operating unit 3, respectively, in response to the operation practice enable signal EE.

As a result, the FIFO 23 and the register 24, both of which has the smallest construction designed to hold such a small number of data, provide the above-described beneficial effect that the address signal Aa-addressed data and the address signal Ab-addressed data can be parallel-transferred with high frequency to the FIFO 23 and the register 24, respectively, when such transferred data are the vector data having a lot of successive addressing.

This feature realizes a cost reduction and circuit downsizing.

Furthermore, when the source memory 21 contains the address signal Aa-addressed data and the address signal Ab-addressed data at either the memory 211 or the memory 212, and further when neither the FIFO 23 nor the register 24 retain data (in other words, when the FIFO 23 and the register 24 are in state 1, and further when contention on memory access occurs), then the source memory 21 feeds the address signal Aa-addressed data into the FIFO 23.

Alternatively, when the source memory 22 includes the address signal Aa-addressed data and the address signal Ab-addressed data at either the memory 221 or the memory 222, and further when neither the FIFO 23 nor the register 24 retain data (in other words, when the FIFO 23 and the register 24 are in state 1, and further when contention on memory access occurs), then the source memory 22 feeds the address signal Aa-addressed data into the FIFO 23.

When the source memory 21 includes the address signal Aa-addressed data and the address signal Ab-addressed data at either the memory 211 or the memory 212, and further when the FIFO 23 retains a piece of data, but the register 24 retains no data (in other words, when the FIFO 23 and the register 24 are in state 2 of FIG. 2, and further when contention on memory access occurs), then the source memory 21 feeds the address signal Ab-addressed data into the register 24.

Alternatively, when the source memory 22 contains the address signal Aa-addressed data and the address signal Ab-addressed data at either the memory 221 or the memory 222, and further when the FIFO 23 retains a piece of data, but the register 24 retains no data (in other words, when the FIFO 23 and the register 24 are in state 2 of FIG. 2, and further when contention on memory access occurs), then the source memory 22 feeds the address signal Ab-addressed data into the register 24.

When the source memory 21 contains the address signal Aa-addressed data and the address signal Ab-addressed data at either the memory 211 or the memory 212, and further when the FIFO 23 retains a piece of data, and the register 24 retains data to be operated with the data retained in the FIFO 23 (in other words, when the FIFO 23 and the register 24 are in state 3 of FIG. 2, and further when contention on memory access occurs), then the source memory 21 feeds the address signal Aa-addressed data into the FIFO 23.

Alternatively, when the source memory 22 contains the address signal Aa-addressed data and the address signal Ab-addressed data at either the memory 221 or the memory 222, and further when the FIFO 23 retains a piece of data, and the register 24 holds data to be operated with the data retained in the FIFO 23 (in other words, when the FIFO 23 and the register 24 are in state 3 of FIG. 2, and further when contention on memory access occurs), then the source memory 22 feeds the address signal Aa-addressed data into the FIFO 23.

When the source memory 21 contains the address signal Aa-addressed data and the address signal Ab-addressed data at either the memory 211 or the memory 212, and further when the FIFO 23 retains two pieces of data, and the register 24 maintains data to be operated with one of the data held in the FIFO 23 (in other words, when the FIFO 23 and the register 24 are in state 4 of FIG. 2, and further when contention on memory access occurs), then the source memory 21 feeds the address signal Ab-addressed data into the register 24.

Alternatively, when the source memory 22 contains the address signal Aa-addressed data and the address signal Ab-addressed data at either the memory 221 or the memory 222, and further when the FIFO 23 retains two pieces of data, and the register 24 holds data to be operated with one of the data held in the FIFO 23 (in other words, when the FIFO 23 and the register 24 are in state 4 of FIG. 2, and further when contention on memory access occurs), then the source memory 22 feeds the address signal Ab-addressed data into the register 24.

As a result, the most suitable processing for the FIFO 23 and register 24, each of which has the smallest construction designed to contain such a small number of data, provides the above-described beneficial effect that the address signal Aa-addressed data and the address signal Ab-addressed data can be parallel-transferred with high frequency to the FIFO 23 and the register 24, respectively, when the transferred data are vector data having a lot of successive addressing.

In addition, the present embodiment provides two source memories 21, 22. As a result, the present embodiment is applicable with ease to DSP that includes two memory sources.

The source memories 21,22 are an example of the storage unit as defined in the claims. The FIFO 23 is an example a first data-retaining unit as defined in the claims. The register 24 is an example of a second data-retaining unit as defined in the claims. The memories 211, 221 are an example of a first storage area as defined in the claims. The memories 212, 222 are an example of a second storage area as defined in the claims.

Embodiment 2

Figure 7:
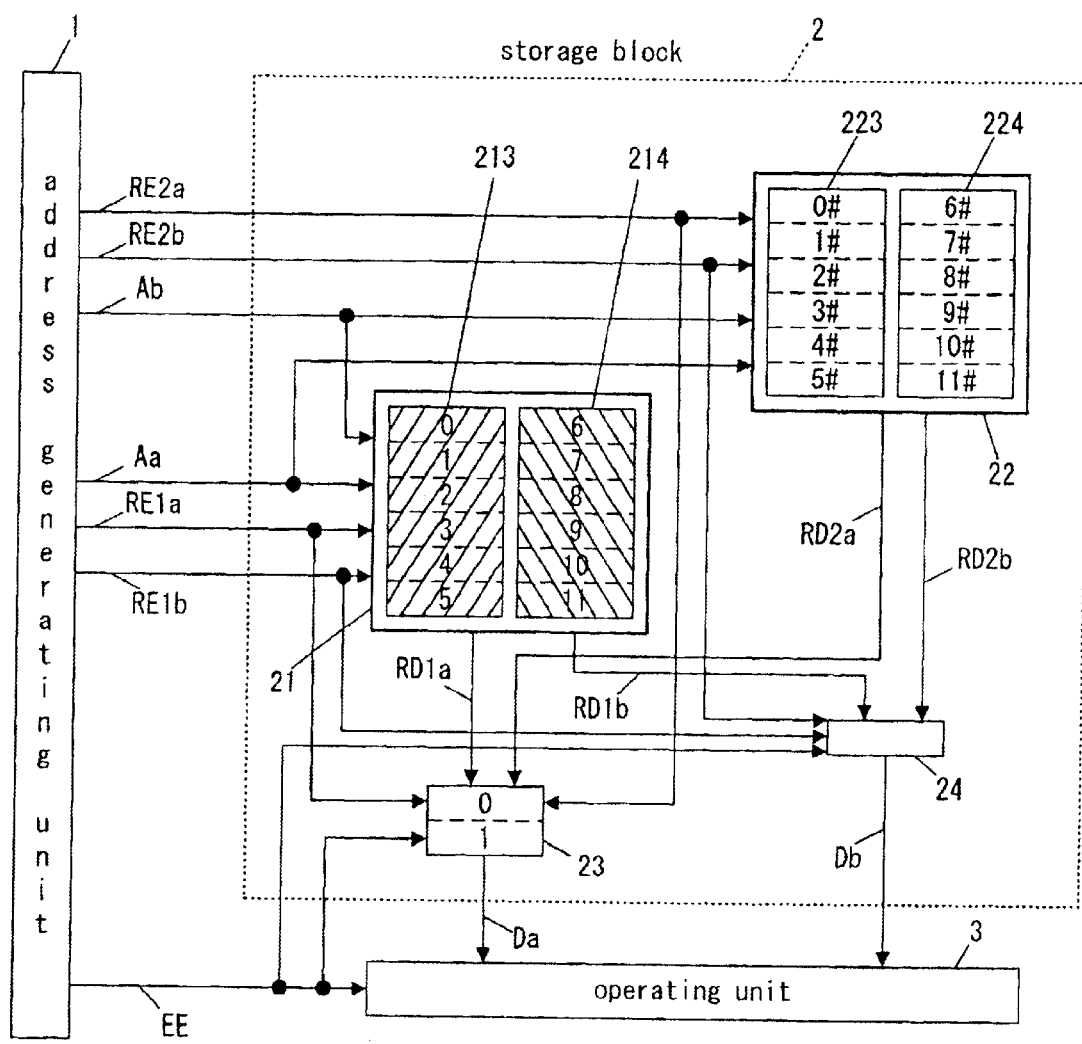
FIG. 7 is a block diagram illustrating an exemplary processor according to a second embodiment.

FIG. 7 is a block diagram illustrating an exemplary processor according to a second embodiment. In FIG. 7, components and signals similar to those of FIG. 1 are identified by the same characters, and descriptions related thereto are omitted.

As seen from FIG. 7, the processor according to the present embodiment differs in structure of source memories 21, 22 from that according to the previous embodiment. The other components are similar to those according to the previous embodiment.

As illustrated in FIG. 7, the processor according to the present embodiment includes source memories 21, 22 in which the former consists of memories 213, 214, while the latter consists of memories 223, 224.

Pursuant to the present embodiment, the source memory 21 has a set of successive addresses allocated to the memory 213 and another different set of successive addresses allocated to the memory 214.

The source memory 22 has a set of successive addresses allocated to the memory 223 and another different set of successive addresses allocated to the memory 224.

According to the present embodiment, the source memory 21 contains each pair of data in common use at the memories 213, 214, respectively.

Similarly, the source memory 22 contains each pair of data in common use at the memories 223, 224, respectively.

As a result, pursuant to the present embodiment, the data are read out in a manner similar to the way in which data are read out when no contention on memory access occurs according to the previous embodiment.

Referring to FIG. 7, a series of addresses 0, 1, 2, 3, 4, 5 as a first half of the total addresses in the source memory 21 is allocated to the memory 213, while a series of addresses 6, 7, 8, 9, 10, 11 as a second half of the total addresses therein is allocated to the memory 214.

Similarly, a series of addresses 0#, 1#, 2#, 3#, 4#, 5# as a first half of the total addresses in the source memory 22 is allocated to the memory 223, while a series of addresses 6#, 7#, 8#, 9#, 10#, 11# as a second half of the total addresses therein is allocated to the memory 224.

In FIG. 7, the source memory 21 has each pair of data in common use contained at the memories 213, 214, respectively. The memories 213, 214 occupy respective spaces for the first and second halves of the total addresses in the source memory 21.

Similarly, the source memory 22 has each pair of data in common use included at the memories 223, 224, respectively. The memories 223, 224 occupy respective spaces for the first and second haves of the total addresses in the source memory 22.

As a result, data readout in FIG. 7 is practiced in a manner similar to the way in which data are read out when no contention on memory access occurs according to the previous embodiment.

Next, the data readout is described using a specific example.

Figure 8:
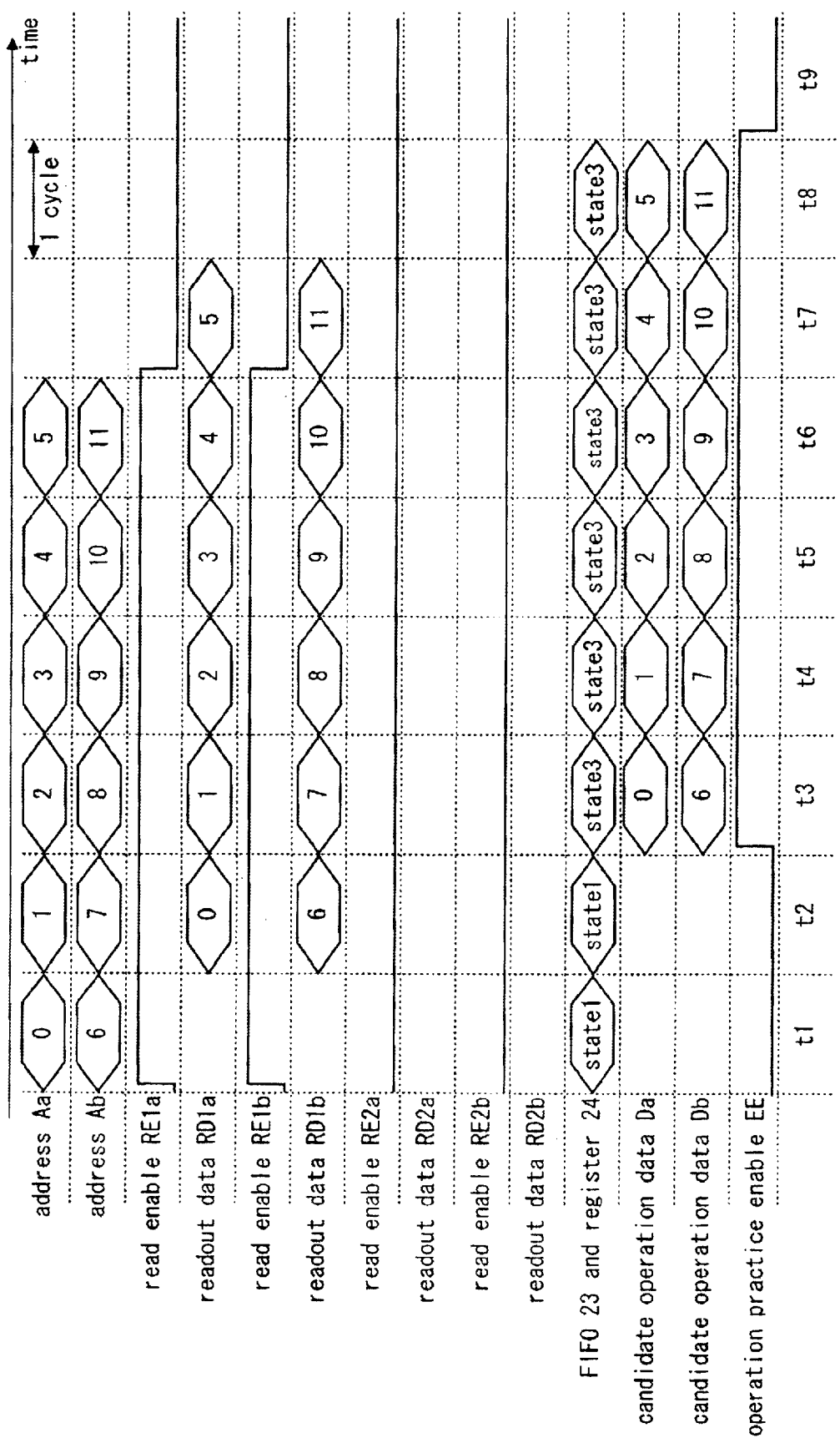
FIG. 8 is a timing diagram, illustrating how data are read out.

FIG. 8 is a timing diagram illustrating how the data are read out in the processor of FIG. 7. As illustrated in FIG. 7, FIG. 8 presupposes that the source memory 21 contains a series of candidate operation data Da-yielding data 0–5 at the memory 213 and a series of candidate operation data Db-yielding data 6–11 at the memory 214.

As illustrated in FIG. 8, at time "t1", the address-generating unit 1 asserts read enable signals RE1a, RE1b.

At time "t2", the memory 213 feeds data 0 as readout data RD1a into the FIFO 23, while the memory 214 feeds data 6 as readout data RD1b into the register 24.

At time "t3", the FIFO 23 and the register 24 retain data 0 and 6, respectively. As a result, the FIFO 23 and register 24 in state 1 of FIG. 2 are put into state 3 of FIG. 2.

At time "t3", the address-generating unit 1 asserts the operation practice enable signal EE nearly simultaneous with the moment when the FIFO 23 and the register 24 hold data 0, 6, respectively.

At time "t3", the FIFO 23 and the register 24 parallel-feed the retained data 0, 6 as candidate operation data "Da", "Db" into the operating unit 3, respectively, nearly simultaneous with the assertion of the operation practice enable signal EE.

Concurrently, at time "t3", the memories 213, 214 feed data 1, 7 as readout data RD1a, RD1b into the FIFO 23 and the register 24, respectively.

At time "t2", the address signal Aa indicative of address 0 is renewed to show address 1 because data 0 is fed as readout data RD1a into the FIFO 23 from the memory 213 in response to the assertion of the read enable signal RE1a.

In addition, at time "t2", the address signal Ab indicative of address 6 is renewed to show address 7 because data 6 is fed as readout data RD1b into the register 24 from the memory 214 in response to the assertion of the read enable signal RE1b.

Similarly, the remaining data 2–5 are fed in succession into the FIFO 23 from the memory 213, while the remaining data 8–11 are successively entered into the register 24 from the memory 214. Each of the data 2–5 and each of the data 8–11 are entered in parallel with one another into the operating unit 3, at which such parallel-entered data are operated.

As seen from FIG. 8, a comparison of address signal Aa with address signal Ab shows that no contention on memory access occurs.

As described above, pursuant to the present embodiment, the source memory 21 consists of the memories 213, 214 in which a set of successive addresses is allocated to the memory 213, while another different set of successive addresses is allocated to the memory 214.

The source memory 22 consists of the memories 223, 224 in which a set of successive addresses is allocated to the memory 223, while another different set of successive addresses is allocated to the memory 224.

More specifically, referring to FIG. 7, the memory 213 occupies one space for the first half of the total addresses in the source memory 21, while the memory 214 occupies another space for the second half of the total addresses therein.

In addition, the memory 223 occupies one space for the first half of the total addresses in the source memory 22, while the memory 224 occupies another space for the second half of the total addresses therein.

The above structure permits a pair of data in common use, which must be stored in the same source memory, to be stored in the same source memory at one memory and another, respectively. As a result, each pair of data can be parallel-transferred to the FIFO 23 and the register 24, respectively, regardless of whether such parallel data readout is practiced according to successive or random addressing.

As a result, high-speed processing is achievable regardless of the successive or random addressing. This feature provides a processor having enhanced performance.

It is to be noted that FIG. 8 illustrates the successive addressing merely by way of data readout but the above parallel data readout is realized according to the random addressing.

Furthermore, when data storage positions (addresses) in the source memory are set in programming in order to obtain the above beneficial effects, then all that is required is to consider that the data can be stored at either one memory or another. This feature imposes a lighter burden on a programmer.

More specifically, for example, when the source memory 21 contains a pair of candidate operation data Da-, Db-yielding data, then one memory 213 can store the candidate operation data Da-yielding data at any storage position, while the other memory 214 can store the candidate operation data Db-yielding data at any storage position.

Thus, when the data storage positions are set for each memory, then parallel data transfer as previously described is achievable. This feature provides easy setting of the data storage positions when compared with the prior art in which the data storage positions are set for each storage position.

In addition, the present embodiment provides two source memories 21, 22. As a result, the present embodiment is applicable with ease to a DSP that includes two source memories.

As described above, the same source can store each pair of data in common use at one memory and another, respectively. Alternatively, the present embodiment allows the source memories 21, 22 to freely contain data.

In this instance, similar to the previous embodiment, data transfer-caused loads can be inhibited, and high-speed processing is attainable. This feature provides a processor having further enhanced performance.

In addition, similar to the previous embodiment, data transfer-caused loads can be suppressed, thereby providing a processor designed to consume a reduced quantity of electric power.

The source memories 21, 22 are an example of storage unit as defined in claims. The FIFO 23 is an example a first data-retaining unit as defined in claims. The register 24 is an example of a second data-retaining unit as defined in claims. The memories 213, 223 are an example of a first storage area as defined in claims. The memories 214, 224 are an example of a second storage area as defined in claims.

Embodiment 3

Figure 9:
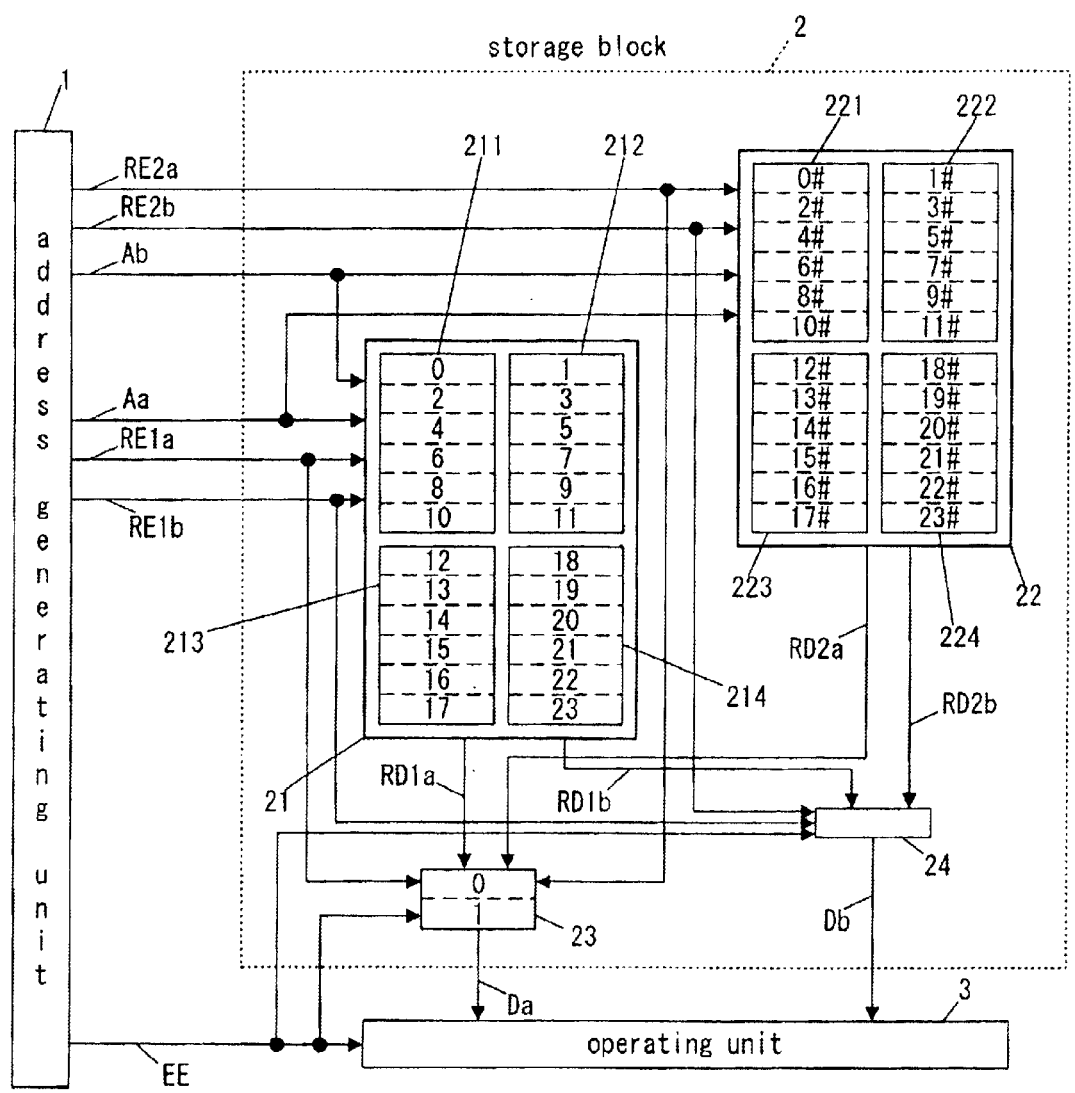
FIG. 9 is a block diagram illustrating an exemplary processor according to a third embodiment.

FIG. 9 is a block diagram illustrating an exemplary processor according to a third embodiment. Components and signals similar to those as illustrated in FIGS. 1 and 7 are identified by the same characters, and descriptions related thereto are omitted.

As seen from FIG. 9, the processor according to the present embodiment is formed by a combination of the respective processor according to the first and second embodiments.

As illustrated in FIG. 9, the processor according to the present embodiment includes a pair of source memories 21, 22. The source memory 21 consists of memories 211, 212, 213, and 214. The source memory 22 consists of memories 221, 222, 223, and 224. The memories 211, 212, 213, and 214 are the same as the memory 211 of FIG. 1, the memory 212 of FIG. 1, the memory 213 of FIG. 7, and the memory 214 of FIG. 7, respectively. The memories 221, 222, 223, and 224 are the same as the memory 221 of FIG. 1, the memory 222 of FIG. 1, the memory 223 of FIG. 7, and the memory 224 of FIG. 7, respectively.

According to the present embodiment, the source memory 21 has respective sets of addresses allocated to the memories 211, 212 in a manner similar to that according to the first embodiment. The source memory 22 has respective sets of addresses allocated to the memories 221, 222 in a manner similar to that according to the first embodiment.

Furthermore, according to the present embodiment, the source memory 21 has respective sets of addresses allocated to the memories 213, 214 in a manner similar to that according to the second embodiment. The source memory 22 has respective sets of addresses allocated to the memories 223, 224 in a manner similar to that according to the second embodiment.

In FIG. 9, successive addresses 0–11 are focused on as a first half of the total addresses in the source memory 21. In the successive addresses 0–11, a set of even-numbered addresses 0, 2, 4, 6, 8, 10 is allocated to the memory 211, while a set of odd-numbered addresses 1, 3, 5, 7, 9, 11 is allocated to the memory 212.

Similarly, successive addresses 12–23 are focused on as a second half of the total addresses in the source memory 21. In the successive addresses 12–23, a set of addresses 12, 13, 14, 15, 16, 17 is allocated to the memory 213 as a first half of the addresses 12–23, while a set of addresses 18, 19, 20, 21, 22, 23 is allocated to the memory 214 as a second half of the addresses 12–23.

Furthermore, successive addresses 0#–11 # are focused on as a first half of the total addresses in the source memory 22. In the successive address 0#–11#, a set of even-numbered addresses 0#, 2#, 4#, 6#, 8#, 10# is allocated to the memory 221, while a set of odd-numbered addresses 1#, 3#, 5#, 7#, 9#, 11# is allocated to the memory 222.

In addition, successive addresses 12#–23# are focused on as a second half of the total addresses in the source memory 22. In the successive address 12#–23#, a set of addresses 12#, 13#, 14#, 15#, 16#, 17# is allocated to the memory 223 as a first half of the addresses 12#–23#, while a set of addresses 18#, 19#, 20#, 21#, 22#, 23# is allocated to the memory 224 as a second half of the addresses 12#–23#.

When the successive addresses 12–23 as the second half of the total addresses in the source memory 21 is focused on, then the source memory 21 contains each pair of data in common use at the memories 213, 214, respectively. The memory 213 occupies one space for the addresses 12–17 as the first half of the addresses 12–23. The memory 214 occupies another space for the address 18–23 as the second half of the addresses 12–23.

Similarly, when successive addresses 12#–23# as the second half of the total addresses in the source memory 22 is focused on, then the source memory 22 contains each pair of data in common use at the memories 223, 224, respectively. The memory 223 occupies one space for the addresses 12#–17# as the first half of the addresses 12#–23#. The memory 224 occupies another space for the address 18#–23# as the second half of the addresses 12#–23#.

As described above, the same source memory can contain each pair of data in common use at one memory and another, respectively. Alternatively, the memories 213, 214, 223, and 224 can freely contain data.

The other structures according to the present embodiment are the same as those according to the first and second embodiments.

As a result, the data contained in the source memory 21 at the memories 211, 212 and the data contained in the source memory 22 at the memories 221, 222 are read out in a manner similar to the way in which data are read out according to the first embodiment.

In addition, the data contained in the source memory 21 at the memories 213, 214 and the data contained in the source memory 22 at the memories 223, 224 are read out in a manner similar to the way in which data are read out according to the second embodiment.

As described above, a combination of the first and second embodiments provides the present embodiment.

Therefore, the present embodiment provides beneficial effects similar to those obtained according to the first and second embodiments.

Since the present embodiment is a combination of the previous embodiments, then the respective data can be parallel-transferred to the FIFO 23 and the register 24 at high frequency when the data stored in the source memory 21 at the memories 211, 212 are vector data to be accessed according successive addressing. In addition, when each pair of data is programmed to be stored in the source memory at the memories 213, 214, respectively, then the pair of data can be parallel-transferred to the FIFO 23 and the register 24, respectively, regardless of successive or random addressing. The same as the above is provided in the source memory 22 as well As a result, high-speed processing is realized, thereby providing a processor having increased performance. In addition, the processor is operable with a greater degree of freedom.

The source memories 21, 22 are an example of storage unit as defined in the claims. The FIFO 23 is an example a first data-retaining unit as defined in the claims. The register 24 is an example of a second data-retaining unit as defined in the claims. The memories 211, 221 are an example of a first storage area as defined in the claims. The memories 212, 222 are an example of a second storage area as defined in the claims. The memories 213, 223 are an example of a third storage area as defined in the claims. The memories 214, 224 are an example of a fourth storage area as defined in the claims.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A processor comprising:

a plurality of storage units operable to store data;

a first data-retaining unit operable to retain data fed from one of said storage units in order to send out the retained data as first candidate operation data;

a second data-retaining unit operable to retain data fed from one of said storage units in order to send out the retained data as second candidate operation data;

an operating unit operable to operate the first and second candidate operation data that are parallel-entered into said operating unit from said first and second data-retaining units, respectively; and an address-generating unit operable to generate a first address signal indicating a storage position at which first candidate operation data-yielding data is stored in one of said storage units, a second address signal indicating a storage position at which second candidate operation data-yielding data is stored in one of said storage units, a first read enable signal generated with each of said storage units for controlling the output of the first candidate operation data-yielding data from the corresponding storage unit, and a second read enable signal generated with each of said storage units for controlling the output of the second candidate operation data-yielding data from the corresponding storage unit;

wherein each of said storage units allows data stored at the storage position indicated by the first address signal to be fed into said first data-retaining unit in response to the first read enable signal; and wherein each of said storage units allows data stored at the storage position indicated by the second address signal to be fed into said second data-retaining unit in response to the second read enable signal.

2. A processor as defined in claim 1, wherein said storage units include first and second storage areas in which a set of even-numbered addresses is allocated to the first storage area, and a set of odd-numbered addresses is allocated to the second storage area.

3. A processor as defined in claim 2, wherein when a same storage unit among said storage units contains first and second address signal-addressed data at one of the first and second storage areas, and when neither said first data-retaining unit nor said second data-retaining unit retains data, then said storage unit feeds the first address signal-addressed data into said first data-retaining unit;

wherein said storage unit feeds the second address signal-addressed data into said second data-retaining unit when said same storage unit contains the first and second address signal-addressed data at one of the first and second storage areas, and further when said second data-retaining unit does not contain data to be operated with every data held in said first data-retaining unit;

wherein said storage unit feeds the first address signal-addressed data into said first data-retaining unit when said same storage unit contains the first and second address signal-addressed data at one of the first and second storage areas, and further when said second data-retaining unit always retains data to be operated with data held in said first data-retaining unit; and wherein said storage unit feeds the second address signal-addressed data into said second data-retaining unit when said same storage unit contains the first and second address signal-addressed data at one of the first and second storage areas, and further when said second data-retaining unit does not retain data to be operated with any data among several pieces of data held in said first data-retaining unit.

4. A processor as defined in claim 3, wherein said first data-retaining unit permits first contained data to go out first;

wherein said first data-retaining unit is designed to retain at most two pieces of data, and said second data-retaining unit is designed to retain at most a piece of data;

wherein said address-generating unit generates an operation practice enable signal for controlling operation practice; and wherein when each of said first and second data-retaining units retains at least a piece of data, then said first and second data-retaining units feed the first and second candidate operation data into said operating unit, respectively, in response to the operation practice enable signal.

5. A processor as defined in claim 4, wherein when a same storage unit among said storage units contains first and second address signal-addressed data at one of the first and second storage areas, and further when neither said first data-retaining unit nor said second data-retaining unit retains data, then said storage unit feeds the first address signal-addressed data into said first data-retaining unit;

wherein said storage unit feeds the second address signal-addressed data into said second data-retaining unit when said same storage unit contains the first and second address signal-addressed data at one of the first and second storage areas, and further when said first data-retaining unit retains a piece of data, but said second data-retaining unit retains no data;

wherein said storage unit feeds the first address signal-addressed data into said first data-retaining unit when said same storage unit contains the first and second address signal-addressed data at one of the first and second storage areas, and further when said first data-retaining unit retains a piece of data while said second data-retaining unit retains data to be operated with the data held in said first data-retaining unit; and wherein said storage unit feeds the second address signal-addressed data into said second data-retaining unit when said same storage unit contains the first and second address signal-addressed data at one of the first and second storage areas, and further when said first data-retaining unit retains two pieces of data while said second data-retaining unit retains data to be operated with one of the two pieces of data held in said first data-retaining unit.

6. A processor as defined in claim 1, wherein said storage units include first and second storage areas in which a set of successive addresses is allocated to the first storage area, and a different set of successive addresses is allocated to the second storage area.

7. A processor as defined in claim 1, wherein said storage units include first, second, third, and fourth storage areas in which a set of even-numbered addresses and a set of odd-numbered addresses are allocated to the first and second storage areas, respectively, and a set of successive addresses which differs from the previous sets of addresses, and a yet further different set of successive addresses are allocated to the third and fourth storage areas, respectively.

8. A processor as defined in claim 7, wherein when a same storage unit among said storage units contains first and second address signal-addressed data at one of the first and second storage areas, and further when neither said first data-retaining unit nor said second data-retaining unit retains data, then said storage unit feeds the first address signal-addressed data into said first data-retaining unit;

wherein said storage unit feeds the second address signal-addressed data into said second data-retaining unit when said same storage unit contains the first and second address signal-addressed data at one of the first and second storage areas, and further when said second data-retaining unit does not contain data to be operated with every data held in said first data-retaining unit;

wherein said storage unit feeds the first address signal-addressed data into said first data-retaining unit when said same storage unit contains the first and second address signal-addressed data at one of the first and second storage areas, and further when said second data-retaining unit always retains data to be operated with data held in said first data-retaining unit; and wherein said storage unit feeds the second address signal-addressed data into said second data-retaining unit when said same storage unit contains the first and second address signal-addressed data at one of the first and second storage areas, and further when said second data-retaining unit does not retain data to be operated with any data among several pieces of data held in said first data-retaining unit.

9. A processor as defined in claim 8, wherein said first data-retaining unit permits first contained data to go out first;

wherein said first data-retaining unit is designed to retain at most two pieces of data, and said second data-retaining unit is designed to retain at most a piece of data;

wherein said address-generating unit generates an operation practice enable signal for controlling operation practice; and wherein when each of said first and second data-retaining units retains at least a piece of data, then said first and second data-retaining units feed the first and second candidate operation data into said operating unit, respectively, in response to the operation practice enable signal.

10. A processor as defined in claim 9, wherein when a same storage unit among said storage units contains first and second address signal-addressed data at one of the first and second storage areas, and further when neither said first data-retaining unit nor said second data-retaining unit retains data, then said storage unit feeds the first address signal-addressed data into said first data-retaining unit;

wherein said storage unit feeds the second address signal-addressed data into said second data-retaining unit when said same storage unit contains the first and second address signal-addressed data at one of the first and second storage areas, and further when said first data-retaining unit retains a piece of data, but said second data-retaining unit retains no data;

wherein said storage unit feeds the first address signal-addressed data into said first data-retaining unit when said same storage unit contains the first and second address signal-addressed data at one of the first and second storage areas, and further when said first data-retaining unit retains a piece of data while said second data-retaining unit retains data to be operated with the data held in said first data-retaining unit; and wherein said storage unit feeds the second address signal-addressed data into said second data-retaining unit when said same storage unit contains the first and second address signal-addressed data at one of the first and second storage areas, and further when said first data-retaining unit retains two pieces of data while said second data-retaining unit retains data to be operated with one of the two pieces of data held in said first data-retaining unit.

11. A processor as defined in claim 1, wherein said plurality of storage units is two storage units.

12. A storage apparatus designed to parallel-feed first and second candidate operation data, said apparatus comprising:

a plurality of storage units operable to store data;

a first data-retaining unit operable to retain data fed from one of said storage units in order to send out the retained data as the first candidate operation data; and a second data-retaining unit operable to retain data fed from one of said storage units in order to send out the retained data as the second candidate operation data;

wherein each of said storage units allows data stored at a storage position addressed by a first address signal to be fed into said first data-retaining unit in response to a first read enable signal, while each of said storage units allows data stored at a storage position addressed by a second address signal to be fed into said second data-retaining unit in response to a second read enable signal;

wherein the first address signal shows the storage position at which first candidate operation data-yielding data is stored in one of said storage units, while the second address signal shows the storage position at which second candidate operation data-yielding data is stored in one of said storage units; and wherein the first read enable signal is generated with each of said storage units for controlling the output of the first candidate operation data-yielding data from the corresponding storage unit, while the second read enable signal is generated with each of said storage units for controlling the output of the second candidate operation data-yielding data from the corresponding storage unit.

13. A storage apparatus as defined in claim 12, wherein said storage units includes first and second storage areas in which a set of even-numbered addresses is allocated to the first storage area, and a set of odd-numbered addresses is allocated to the second storage area.

14. A storage apparatus as defined in claim 13, wherein when a same storage unit among said storage units contains first and second address signal-addressed data at one of the first and second storage areas, and further when neither said first data-retaining unit nor said second data-retaining unit retains data, then said storage unit feeds the first address signal-addressed data into said first data-retaining unit;

wherein said storage unit feeds the second address signal-addressed data into said second data-retaining unit when said same storage unit contains the first and second address signal-addressed data at one of the first and second storage areas, and further when said second data-retaining unit does not contain data to be operated with every data held in said first data-retaining unit;

wherein said storage unit feeds the first address signal-addressed data into said first data-retaining unit when said same storage unit contains the first and second address signal-addressed data at one of the first and second storage areas, and further when said second data-retaining unit always retains data to be operated with data held in said first data-retaining unit; and wherein said storage unit feeds the second address signal-addressed data into said second data-retaining unit when said same storage unit contains the first and second address signal-addressed data at one of the first and second storage areas, and further when said second data-retaining unit does not retain data to be operated with any data among several pieces of data held in said first data-retaining unit.

15. A storage apparatus as defined in claim 14, wherein said first data-retaining unit permits first contained data to go out first;

wherein said first data-retaining unit is designed to retain at most two pieces of data, and said second data-retaining unit is designed to retain at most a piece of data;

wherein when each of said first and second data-retaining units retains at least a piece of data, then said first and second data-retaining units feed the first and second candidate operation data, respectively, in response to an operation practice enable signal; and wherein the operation practice enable signal controls operation practice.

16. A storage apparatus as defined in claim 15, wherein when a same storage unit among said storage units contains first and second address signal-addressed data at one of the first and second storage areas, and further when neither said first data-retaining unit nor said second data-retaining unit retains data, then said storage unit feeds the first address signal-addressed data into said first data-retaining unit;

wherein said storage unit feeds the second address signal-addressed data into said second data-retaining unit when said same storage unit contains the first and second address signal-addressed data at one of the first and second storage areas, and further when said first data-retaining unit retains a piece of data, but said second data-retaining unit retains no data;

wherein said storage unit feeds the first address signal-addressed data into said first data-retaining unit when said same storage unit contains the first and second address signal-addressed data at one of the first and second storage areas, and further when said first data-retaining unit retains a piece of data while said second data-retaining unit retains data to be operated with the data held in the first data-retaining unit; and wherein said storage unit feeds the second address signal-addressed data into said second data-retaining unit when said same storage unit contains the first and second address signal-addressed data at one of the first and second storage areas, and further when said first data-retaining unit retains two pieces of data while said second data-retaining unit retains data to be operated with one of the two pieces of data held in said first data-retaining unit.

17. A storage apparatus as defined in claim 12, wherein said storage units includes first and second storage areas in which a set of successive addresses is allocated to the first storage area, and a different set of successive addresses is allocated to the second storage area.

18. A storage apparatus as defined in claim 12, wherein said storage units include first, second, third, and fourth storage areas, in which a set of even-numbered addresses and a set of odd-numbered addresses are allocated to the first and second storage areas, respectively, and a set of successive addresses, which differs from the previous sets of addresses, and a yet further different set of successive addresses are allocated to the third and fourth storage areas, respectively.

19. A storage apparatus as defined in claim 18, wherein when a same storage unit among said storage units contains first and second address signal-addressed data at one of the first and second storage areas, and further when neither said first data-retaining unit nor said second data-retaining unit retains data, then said storage unit feeds the first address signal-addressed data into said first data-retaining unit;

wherein said storage unit feeds the second address signal-addressed data into said second data-retaining unit when said same storage unit contains the first and second address signal-addressed data at one of the first and second storage areas, and further when said second data-retaining unit does not contain data to be operated with every data held in said first data-retaining unit;

wherein said storage unit feeds the first address signal-addressed data into said first data-retaining unit when said same storage unit contains the first and second address signal-addressed data at one of the first and second storage areas, and further when said second data-retaining unit always retains data to be operated with data held in said first data-retaining unit; and wherein said storage unit feeds the second address signal-addressed data into said second data-retaining unit when said same storage unit contains the first and second address signal-addressed data at one of the first and second storage areas, and further when said second data-retaining unit does not retain data to be operated with any data among several pieces of data held in said first data-retaining unit.

20. A storage apparatus as defined in claim 19, wherein said first data-retaining unit permits first contained data to go out first;

wherein said first data-retaining unit is designed to retain at most two pieces of data, and said second data-retaining unit is designed to retain at most a piece of data;

wherein when each of said first and second data-retaining units retains at least a piece of data, then said first and second data-retaining units feed the first and second candidate operation data, respectively, in response to an operation practice enable signal; and wherein the operation practice enable signal controls operation practice.

21. A storage apparatus as defined in claim 20, wherein when a same storage unit among said storage units contains first and second address signal-addressed data at one of the first and second storage areas, and further when neither said first data-retaining unit nor said second data-retaining unit retains data, then said storage unit feeds the first address signal-addressed data into said first data-retaining unit;

wherein said storage unit feeds the second address signal-addressed data into said second data-retaining unit when said same storage unit contains the first and second address signal-addressed data at one of the first and second storage areas, and further when said first data-retaining unit retains a piece of data, but said second data-retaining unit retains no data;

wherein said storage unit feeds the first address signal-addressed data into said first data-retaining unit when said same storage unit contains the first and second address signal-addressed data at one of the first and second storage areas, and further when said first data-retaining unit retains a piece of data while said second data-retaining unit retains data to be operated with the data held in said first data-retaining unit; and wherein said storage unit feeds the second address signal-addressed data into said second data-retaining unit when said same storage unit contains the first and second address signal-addressed data at one of the first and second storage areas, and further when said first data-retaining unit retains two pieces of data while said second data-retaining unit retains data to be operated with one of the two pieces of data held in said first data-retaining unit.

22. A storage apparatus as defined in claim 12, wherein said plurality of storage units is two storage units.

* * * * *